US012763961B2

(12) United States Patent
Xu

(10) Patent No.: US 12,763,961 B2
(45) Date of Patent: Oct. 13, 2026

(54) REMOTE CONTROL METHOD AND APPARATUS

(71) Applicant: Yinwang Intelligent Technologies Co., Ltd., Shenzhen (CN)

(72) Inventor: Zhenglei Xu, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 18/675,599

(22) Filed: May 28, 2024

(65) Prior Publication Data

US 2024/0313960 A1 Sep. 19, 2024

Related U.S. Application Data

(63) Continuation of application No. PCT/CN2021/134045, filed on Nov. 29, 2021.

(51) Int. Cl.
*H04L 9/32* (2006.01)
*H04L 9/40* (2022.01)

(52) U.S. Cl.
CPC ........ *H04L 9/3234* (2013.01); *H04L 63/0428* (2013.01)

(58) Field of Classification Search
CPC .......................... H04L 9/3234; H04L 63/0428
See application file for complete search history.

(56) References Cited

U.S. PATENT DOCUMENTS

| | | | | |
|---|---|---|---|---|
| 2017/0012964 | A1* | 1/2017 | Ceppi | H04L 63/0807 |
| 2019/0356653 | A1* | 11/2019 | Li | H04L 9/0897 |
| 2019/0372977 | A1* | 12/2019 | Ben-David | H04L 63/0807 |
| 2021/0056196 | A1* | 2/2021 | Jain | G06F 21/45 |
| 2022/0272099 | A1* | 8/2022 | Birch | H04L 63/20 |

FOREIGN PATENT DOCUMENTS

| | | | |
|---|---|---|---|
| CN | 103312515 | A | 9/2013 |
| CN | 107370668 | A | 11/2017 |
| CN | 108206858 | A | 6/2018 |
| GB | 2575250 | A | 1/2020 |

* cited by examiner

*Primary Examiner* — Chau Le
(74) *Attorney, Agent, or Firm* — WOMBLE BOND DICKINSON (US) LLP

(57) ABSTRACT

Embodiments of this application provide a remote control method and apparatus. The method includes: A remote device receives second request information from a device management system, where the second request information includes a remote control instruction and an authorization token; the remote device verifies validity of the authorization token; and the remote device verifies validity of the remote control instruction by using the authorization token when the authorization token is valid. In some embodiments of this application, the authorization token and the remote control instruction can be verified to verify whether the remote control instruction is within a range of the authorization token to ensure that the remote control instruction is authorized by a user and reduce risks of privacy leakage and property loss of the user.

20 Claims, 14 Drawing Sheets

REMOTE CONTROL METHOD AND APPARATUS

CROSS-REFERENCE TO RELATED APPLICATIONS

This application is a continuation of International Application No. PCT/CN2021/134045, filed on Nov. 29, 2021, the disclosure of which is hereby incorporated by reference in its entirety.

TECHNICAL FIELD

Embodiments of this application relate to the remote control field, and more particularly, to an identity authentication and authentication method and apparatus in a remote control procedure.

BACKGROUND

With evolution of network technologies and popularization of intelligent devices, remote control of a device by using a terminal brings much convenience to a user, and a remote control capability has become one of basic capabilities of the intelligent devices. In the remote control procedure, the terminal may send a remote control instruction to a remote device (for example, a smart vehicle or a smart home device) by using a device management system deployed on the cloud, so as to implement intelligent control of the device, and make remote control more comfortable and convenient.

In the process of implementing intelligent control of the device, there is a high requirement on security of the remote control system. Currently, in a common remote control security solution, a remote device only verifies s a device management system, but cannot directly verify an identity or an operation intention of an operator (user). Once the device management system is attacked, or the operation and maintenance personnel do not follow regulations, and attack the device management system from the remote device, the privacy, property, and life of the user are infringed.

SUMMARY

Embodiments of this application provide a remote control method and apparatus. A terminal user issues an authorization token, and a remote device verifies the received authorization token and a remote control instruction, to verify whether the remote control instruction is sent or authorized by an authorized user and whether the remote control instruction is within a range of the authorization token, so as to ensure that the remote control instruction is authorized by the user, and reduce risks of privacy leakage and property loss of the user.

According to a first aspect, a remote control method is provided. The method includes: A remote device receives second request information from a device management system, where the second request information includes a remote control instruction and an authorization token; the remote device verifies validity of the authorization token; and the remote device verifies validity of the remote control instruction by using the authorization token when the authorization token is valid.

In one embodiment, authorization token content includes at least one of a token ID, an issuer identifier, an authorized-object identifier, an authorization content list, an issuance time, a validity period start time, and a validity period end time; the authorization content list includes at least one of a controlled-object identifier, an operation, and a key parameter; and the authorization token signature information includes signature data, or the authorization token signature information includes signature data and a signature algorithm.

In one embodiment, the authorization token content and the authorization token signature may be changed according to an actual requirement. For example, the authorization token may include a part of the authorization token content. For another example, the authorization token signature may include only signature data. For another example, additional cryptographic measures such as a secondary token signature may be performed on the authorization token.

In this embodiment of this application, the authorization token content of the generated authorization token may be flexibly adjusted according to an actual requirement, to adapt to different application scenarios of the authorization token. In addition, the generated authorization token may be signed and/or encrypted to ensure secure use of the authorization token.

In one embodiment, the verifying validity of the authorization token includes at least one of the following verifications: verifying whether the device management system is consistent with the authorized-object identifier, verifying whether a controlled-object ID is consistent with a remote device identifier, verifying time validity of the token, verifying whether a signature verification key of the token issuer is configured on the remote device, and verifying consistency of a digital signature of the authorization token.

In one embodiment, the verifying validity of the remote control instruction by using the authorization token includes at least one of the following verifications: verifying whether the remote device identifier is consistent with the controlled-object identifier in the authorization token, verifying whether the remote control instruction is within an allowed operation range of the authorization token, and verifying whether a key parameter is within a key parameter range of the authorization token.

In this embodiment of this application, the remote device may perform validity verification on the received authorization token, and verify validity of the remote control instruction by using the authorization token after the validity verification succeeds. The remote device executes the remote control instruction only when both verifications succeed. In this way, it can be ensured that the remote control instruction is consistent with intention of a device owner/authorizer, and risks of privacy leakage and property loss of the user are reduced.

In one embodiment, in a conventional remote control solution, a user may directly or indirectly deliver a command to a remote device by using a device management system, to control the remote device to operate. However, in the conventional remote control solution, the remote device only verifies the device management system, but cannot directly verify an identity or an operation intention of an operator (a user). In other words, the remote device cannot determine whether a received remote control instruction is authorized by the user. Once the device management system is attacked, or the operation and maintenance personnel do not follow regulations, and attack the remote device, the privacy, property, and life of the user are infringed.

For example, the device management system may be attacked by a hacker. The hacker can intrude the device management system to steal and tamper with the remote control instruction of the user. The remote device cannot identify whether the remote control instruction is authorized by the user. Once the remote device executes the remote control instruction tampered by the hacker, the user's property may be lost.

For another example, the operation and maintenance personnel of the device management system may perform an operation beyond the scope of their duties, and consequently, the remote control instruction does not meet the operation intention of the user. Because the remote device cannot identify whether the remote control instruction meets an authorization scope of the user, once the remote device executes the remote control instruction that does not meet the operation intention of the user, privacy and property security of the user cannot be ensured.

In this embodiment of this application, the remote control instruction and the authorization token are transmitted together. After receiving the remote control instruction and the authorization token, the remote device needs to verify the remote control instruction by using the authorization token, to verify whether the remote control instruction is within a range of the authorization token, so as to ensure that the remote control instruction is authorized by the user, thereby avoiding a threat to security of the remote device when the operation and maintenance personnel do not follow regulations when performing an operation.

With reference to the first aspect, in some implementations of the first aspect, the second request information further includes a whitelist, and the verifying validity of the authorization token further includes: verifying whether the authorization token ID is in an ID whitelist.

With reference to the first aspect, in some implementations of the first aspect, the second request information further includes a blacklist, and the verifying validity of the authorization token further includes: verifying whether the authorization token ID is in an ID blacklist.

In one embodiment, when remote control involves a long-term task, a feature of the long-term task is that the task may be canceled. In this case, the authorization token also needs to be revoked synchronously. Therefore, a mechanism is needed to ensure that the revoked authorization token is not used without permission. In this embodiment of this application, a whitelist is deployed to cooperate in validity verification of the authorization token. The whitelist solution may also be replaced with a blacklist solution, and revoked tokens are listed in the blacklist, so as to ensure secure use of the authorization token.

In this embodiment of this application, the whitelist may be issued when the authorization token is signed, and after the authorization token is successfully verified, it is determined whether the authorization token ID is in the ID whitelist, so as to ensure that the authorization token is not revoked. An authorization token can be used only after the whitelist verification succeeds. Alternatively, a blacklist may be issued when the authorization token is signed, and after the authorization token passes the verification, it may be determined whether the authorization token ID is in the ID blacklist. The authorization token ID can be used only when the authorization token ID is not in the blacklist. In the foregoing manner, it can be ensured that the authorization token is not revoked, and risks of privacy leakage and property loss of the user are reduced.

With reference to the first aspect, in some implementations of the first aspect, the method further includes: The remote device verifies validity of the whitelist.

In this embodiment of this application, the validity of the whitelist may be verified when the whitelist is issued. The whitelist is used to verify the validity of the authorization token only when the whitelist is valid. This can ensure secure use of the whitelist and reduce risks of privacy leakage and property loss of the user.

With reference to the first aspect, in some implementations of the first aspect, the verifying validity of the whitelist includes at least one of the following verifications: verifying consistency between a controlled-object identifier in the whitelist and the remote device identifier, verifying whether a whitelist issuance time is less than or equal to a first threshold, and verifying consistency of a whitelist signature.

In one embodiment, the verifying whether a whitelist issuance time is less than or equal to a first threshold may be determining whether the whitelist issuance time is within a range allowed by a current-time difference of a remote device system. The first threshold represents a maximum value allowed by the current-time difference of the remote device system, and a value of the first threshold may be preset according to an actual situation.

For example, assuming that the allowed current-time difference of the remote device system is within 10 seconds, if the whitelist issuance time is 8 seconds, the whitelist issuance time meets the requirement; or if the whitelist issuance time is 12 seconds, the whitelist issuance time does not meet the requirement, and the whitelist fails to be updated.

The verifying consistency of a whitelist signature may mean verifying validity of the whitelist signature by using a key. If the whitelist signature is consistent with the key, the signature verification succeeds; or if the whitelist signature is inconsistent with the key, the signature verification fails, and the whitelist fails to be updated.

In this embodiment of this application, validity verification may be performed on the issued whitelist. By verifying consistency between a whitelist-controlled object and a remote device identifier, verifying whether the whitelist issuance time is less than or equal to the first threshold, and verifying consistency of the whitelist signature, it is ensured that the whitelist is not attacked, thereby reducing risks of privacy leakage and property loss of the user.

With reference to the first aspect, in some implementations of the first aspect, the method further includes: The remote device determines a whitelist feature value according to the whitelist; the remote device signs and/or encrypts the whitelist feature value; and the remote device sends the signed and/or encrypted whitelist feature value to the terminal device.

The whitelist feature value records key information or fingerprint information of the whitelist, and may replace the whitelist in some scenarios. In addition, the whitelist feature value occupies small space of a device, and storage overheads of the device such as a mobile phone can be reduced. In addition, the remote device may further ensure secure use of the whitelist feature value by signing and/or encrypting the whitelist feature value.

The whitelist feature value may be obtained in different manners. For example, some algorithms or functions may be used to abstract some key information (key fields, bytes, and the like) from the whitelist to obtain the whitelist feature value. In one embodiment, a Hash function may be used to process the key information in the whitelist, generate a Hash function value, and use the Hash function value as the whitelist feature value. For another example, the whitelist ID may be used as a whitelist feature value.

In this embodiment of this application, a whitelist feature value mechanism is provided, and the remote device may obtain a whitelist feature value from the whitelist. Because the whitelist feature value records key information or fingerprint information of the whitelist, the whitelist feature value can replace the whitelist in some scenarios. In addition, the whitelist feature value occupies small space of a device, and storage overheads of the device such as a mobile phone can be reduced. In addition, the remote device may further ensure secure use of the whitelist feature value by signing and/or encrypting the whitelist feature value.

According to a second aspect, a remote control method is provided. The method includes: A terminal device obtains an authorization token; and the terminal device sends first request information to a device management system, where the first request information includes an operation request and the authorization token, the operation request is used to request the device management system to deliver a remote control instruction to a remote device, and the authorization token is used to verify validity of the remote control instruction.

In one embodiment, authorization token content includes at least one of a token ID, an issuer identifier, an authorized-object identifier, an authorization content list, an issuance time, a validity period start time, and a validity period end time; the authorization content list includes at least one of a controlled-object identifier, an operation, and a key parameter; and the authorization token signature information includes signature data, or the authorization token signature information includes signature data and a signature algorithm.

In this embodiment of this application, the first request information may carry the authorization token and the operation request of the user. The device management system delivers the remote control instruction to the remote device according to the operation request of the user. The authorization token is used to verify validity of the remote control instruction, and verify whether the remote control instruction is within a range of the authorization token, so as to ensure that the remote control instruction is authorized by the user, thereby reducing risks of privacy leakage and property loss of the user.

With reference to the second aspect, in some implementations of the second aspect, the first request information further includes a whitelist, and the whitelist includes whitelist content and whitelist signature information; the whitelist content includes at least one of a whitelist ID, an issuer identifier, an authorized-object identifier, a controlled object, an authorization token ID list, and an issuance time; and the whitelist signature information includes signature data, or the whitelist signature information includes signature data and a signature algorithm.

Content of the whitelist may be flexibly adjusted according to an actual requirement, to adapt to different whitelist application scenarios. For example, the whitelist may include a part of content of the whitelist. For another example, the signature data of the whitelist may be encrypted to ensure secure use of the whitelist.

In this embodiment of this application, to support use of the long-term task authorization token, the whitelist is deployed in the first request information, so that the remote device subsequently verifies whether the authorization token content is in the whitelist, thereby ensuring secure use of the authorization token.

With reference to the second aspect, in some implementations of the second aspect, the method further includes: The terminal device obtains a whitelist, and verifies validity of the whitelist. The verifying validity of the whitelist includes at least one of the following verifications; verifying whether a whitelist issuer is valid, verifying whether a whitelist-authorized object is valid, verifying whether a whitelist-controlled object is valid, and verifying consistency of a whitelist signature.

In this embodiment of this application, the terminal device may obtain the whitelist and verify validity of the whitelist. The whitelist is used only when validity verification of the whitelist succeeds, thereby ensuring secure use of the whitelist.

With reference to the second aspect, in some implementations of the second aspect, the method further includes: The terminal device stores a whitelist feature value. The verifying validity of the whitelist includes: The terminal device verifies the validity of the whitelist by using the whitelist feature value.

In this embodiment of this application, the terminal device may pre-store a whitelist feature value, and verify the validity of the whitelist by using the pre-stored whitelist feature value. The whitelist is used only when validity verification of the whitelist succeeds, thereby ensuring secure use of the whitelist.

With reference to the second aspect, in some implementations of the second aspect, the method further includes: The terminal device obtains the whitelist feature value from a remote device; and the terminal device verifies the whitelist feature value, and the terminal stores the whitelist feature value if the verification succeeds.

In this embodiment of this application, the feature value obtained from the remote device may be verified by using the pre-stored whitelist feature value. If the feature values are the same, the verification succeeds, and the terminal device stores the verified whitelist feature value. In this way, the obtained whitelist feature value can be prevented from being without permission.

With reference to the second aspect, in some implementations of the second aspect, the whitelist feature value is a signed and/or encrypted whitelist feature value.

With reference to the second aspect, in some implementations of the second aspect, that the terminal device verifies the whitelist feature value further includes: performing signature verification and/or decryption on the whitelist feature value.

In this embodiment of this application, after receiving the signed and/or encrypted whitelist feature value, the terminal device may verify the whitelist feature value signature, and/or decrypt the encrypted whitelist feature value. In this way, secure use of the whitelist feature value can be improved.

With reference to the second aspect, in some implementations of the second aspect, the method further includes: The terminal device generates authorization token content according to a user operation, and issues the authorization token; the terminal device determines a task type of a user operation; and the terminal device determines, according to the task type of the user operation, whether to issue a new authorization token and whether to update the whitelist.

In this embodiment of this application, an authorization token may be issued as required based on a user operation. In addition, it may be determined, according to a task type of a user operation, whether to issue a new token and whether to update the whitelist. The authorization token is applicable to a long-term authorization scenario, and secure use of the authorization token is ensured.

With reference to the second aspect, in some implementations of the second aspect, the method further includes: updating a key; the terminal device re-issues the whitelist and the authorization token by using an updated key; and the terminal device sends third request information to the device management system, where the third request information includes the re-issued whitelist and authorization token.

In one embodiment, before the re-issuing the whitelist and the authorization token by using an updated key, this operation may further include verifying validity of the whitelist and the authorization token by using the non-updated key.

In this embodiment of this application, in a scenario in which a key needs to be updated, the authorization token and the whitelist are re-issued by using the updated key, so that secure use of the authorization token and the whitelist is ensured.

According to a third aspect, a remote control method is provided. The method includes: receiving first request information, where the first request information includes an operation request and an authorization token; and generating a remote control instruction according to the operation request, where the remote control instruction is used to instruct a remote device to execute the operation request.

With reference to the third aspect, in some implementations of the third aspect, the method further includes: sending second request information to the remote device, where the second request information includes the remote control instruction and the authorization token, and the authorization token is used to verify validity of the remote control instruction.

In this embodiment of this application, the device management system processes different operation requests received from the user, generates a corresponding remote control instruction, and sends the operation instruction and the authorization token to the remote device, so that the remote device verifies validity of the remote control instruction by using the authorization token, so that the user can perform remote control.

According to a fourth aspect, a remote control method is provided. The method includes: A remote device receives second request information from a device management system, where the second request information includes a whitelist; and the remote device verifies validity of the whitelist.

With reference to the fourth aspect, in some implementations of the fourth aspect, the verifying validity of the whitelist includes at least one of the following verifications: verifying consistency between a controlled-object identifier in the whitelist and the remote device identifier, verifying whether a whitelist issuance time is less than or equal to a first threshold, and verifying consistency of a whitelist signature.

With reference to the fourth aspect, in some implementations of the fourth aspect, the method further includes: The remote device determines a whitelist feature value based on the whitelist, where the whitelist feature value identifies the whitelist; the remote device signs and/or encrypts the whitelist feature value; and the remote device sends the signed and/or encrypted whitelist feature value to a terminal device.

According to a fifth aspect, a remote control method is provided. The method includes: A terminal device obtains a whitelist, and verifies validity of the whitelist. The verifying validity of the whitelist includes at least one of the following verifications: verifying whether a whitelist issuer is valid, verifying whether a whitelist-authorized object is valid, verifying whether a whitelist-controlled object is valid, and verifying consistency of a whitelist signature.

With reference to the fifth aspect, in some implementations of the fifth aspect, the method includes: The terminal device stores a whitelist feature value. The verifying validity of the whitelist includes: The terminal device verifies the validity of the whitelist by using the whitelist feature value.

With reference to the fifth aspect, in some implementations of the fifth aspect, the method includes: The terminal device obtains the whitelist feature value from a remote device; and the terminal device verifies the whitelist feature value, and the terminal stores the whitelist feature value if the verification succeeds.

With reference to the fifth aspect, in some implementations of the fifth aspect, the whitelist feature value is a signed and/or encrypted whitelist feature value.

With reference to the fifth aspect, in some implementations of the fifth aspect, that the terminal device verifies the whitelist feature value further includes: performing signature verification and/or decryption on the whitelist feature value.

In this embodiment of this application, after receiving the signed and/or encrypted whitelist feature value, the terminal device may verify the whitelist feature value signature, and/or decrypt the encrypted whitelist feature value. In this way, secure use of the whitelist feature value can be improved.

With reference to the fifth aspect, in some implementations of the fifth aspect, the method further includes: The terminal device generates authorization token content according to a user operation, and issues the authorization token; the terminal device determines a task type of a user operation; and the terminal device determines, according to the task type of the user operation, whether to issue a new authorization token and whether to update the whitelist.

With reference to the fifth aspect, in some implementations of the fifth aspect, the method further includes: The terminal device sends first request information to the device management system, where the first request information includes a task request, the authorization token, and the whitelist.

With reference to the fifth aspect, in some implementations of the fifth aspect, the whitelist includes whitelist content and whitelist signature information; the whitelist content includes at least one of a whitelist ID, an issuer identifier, an authorized-object identifier, a controlled object, an authorization token ID list, and an issuance time; and the whitelist signature information includes signature data, or the whitelist signature information includes signature data and a signature algorithm.

With reference to the fifth aspect, in some implementations of the fifth aspect, the method further includes: updating a key; the terminal device re-issues the whitelist and the authorization token by using an updated key; and the terminal device sends third request information to the device management system, where the third request information includes the re-issued whitelist and authorization token.

According to a sixth aspect, a remote control apparatus is provided. The apparatus includes a transceiver unit and a processing unit. The transceiver unit is configured to receive second request information, where the second request information includes a remote control instruction and an authorization token; and the processing unit is configured to: verify validity of the authorization token, and verify validity of the remote control instruction by using the authorization token if the authorization token is valid.

With reference to the sixth aspect, in some implementations of the sixth aspect, the processing unit is configured to perform at least one of the following verifications: verifying whether the device management system is consistent with the authorized-object identifier, verifying whether a controlled-object ID is consistent with a remote device identifier, verifying time validity of the token, verifying whether a signature verification key of the token issuer is configured on the remote device, and verifying consistency of a digital signature of the authorization token.

With reference to the sixth aspect, in some implementations of the sixth aspect, the processing unit is configured to perform at least one of the following verifications: verifying whether the remote device identifier is consistent with the controlled-object identifier in the authorization token, verifying whether the remote control instruction is within an allowed operation range of the authorization token, and verifying whether a key parameter is within a key parameter range of the authorization token.

With reference to the sixth aspect, in some implementations of the sixth aspect, the second request information includes a blacklist, and the processing unit is configured to verify whether an authorization token ID is in an ID blacklist.

With reference to the sixth aspect, in some implementations of the sixth aspect, the second request information includes a whitelist, and the processing unit is configured to verify whether an authorization token ID is in an ID whitelist.

With reference to the sixth aspect, in some implementations of the sixth aspect, the processing unit is further configured to verify validity of the whitelist.

With reference to the sixth aspect, in some implementations of the sixth aspect, the processing unit is configured to perform at least one of the following verifications: verifying consistency between a whitelist-controlled object and a remote device identifier, verifying whether a whitelist issuance time is less than or equal to a first threshold, and verifying consistency of a whitelist signature.

With reference to the sixth aspect, in some implementations of the sixth aspect, the processing unit is further configured to determine a whitelist feature value according to the whitelist, where the whitelist feature value identifies the whitelist; the processing unit is further configured to sign and/or encrypt the whitelist feature value; and the transceiver unit is further configured to send the signed and/or encrypted whitelist feature value.

According to a seventh aspect, a remote control apparatus is provided. The apparatus includes an obtaining unit and a transceiver unit. The obtaining unit is configured to obtain an authorization token, and the transceiver unit is configured to send first request information to a device management system, where the first request information includes an operation request and the authorization token. The operation request is used to request the device management system to deliver a remote control instruction to a remote device, and the authorization token is used to verify validity of the remote control instruction.

With reference to the seventh aspect, in some implementations of the seventh aspect, the authorization token includes authorization token content and authorization token signature information; and the authorization token content includes at least one of a token ID, an issuer identifier, an authorized-object identifier, an authorization content list, an issuance time, a validity period start time, and a validity period end time. The authorization content list includes at least one of a controlled-object identifier, an operation, and a key parameter; and the authorization token signature information includes signature data, or the authorization token signature information includes signature data and a signature algorithm.

With reference to the seventh aspect, in some implementations of the seventh aspect, the first request information further includes a whitelist, and the whitelist includes whitelist content and whitelist signature information; the whitelist content includes at least one of a whitelist ID, an issuer identifier, an authorized-object identifier, a controlled object, an authorization token ID list, and an issuance time; and the whitelist signature information includes signature data, or the whitelist signature information includes signature data and a signature algorithm.

With reference to the seventh aspect, in some implementations of the seventh aspect, the obtaining unit is further configured to obtain a whitelist; and the apparatus further includes a processing unit, configured to verify validity of the whitelist; and the processing unit is configured to perform at least one of the following verifications: verifying whether a whitelist issuer is valid, verifying whether a whitelist-authorized object is valid, verifying whether a whitelist-controlled object is valid, and verifying consistency of a whitelist signature.

With reference to the seventh aspect, in some implementations of the seventh aspect, the apparatus further includes a storage unit, configured to store a whitelist feature value, where the whitelist feature value identifies the whitelist; and the processing unit is further configured to verify the validity of the whitelist by using the whitelist feature value.

With reference to the seventh aspect, in some implementations of the seventh aspect, the transceiver unit is further configured to obtain a whitelist feature value from a remote device; and the processing unit is further configured to verify the whitelist feature value, and the storage unit stores the whitelist feature value if the verification succeeds.

With reference to the seventh aspect, in some implementations of the seventh aspect, the whitelist feature value is a signed and/or encrypted whitelist feature value.

With reference to the seventh aspect, in some implementations of the seventh aspect, the processing unit is further configured to perform signature verification and/or decryption on the whitelist feature value.

With reference to the seventh aspect, in some implementations of the seventh aspect, the processing unit in the apparatus is further configured to: generate the authorization token content, and issue the authorization token; determine a task type of a user operation; and determine, according to the task type of the user operation, whether to issue a new authorization token and whether to update the whitelist.

With reference to the seventh aspect, in some implementations of the seventh aspect, the processing unit in the apparatus is further configured to update a key, and re-issue a whitelist and an authorization token by using an updated key; and the transceiver unit is further configured to send third request information to the device management system, where the third request information includes the re-issued whitelist and authorization token.

According to an eighth aspect, an authorization token apparatus for remote control is provided. The apparatus includes a transceiver unit and a processing unit. The transceiver unit is configured to receive first request information, where the first request information includes an operation request and an authorization token. The processing unit is configured to generate a remote control instruction according to the operation request, where the remote control instruction is used to instruct a remote device to execute the operation request.

With reference to the eighth aspect, in some implementations of the eighth aspect, the transceiver unit is further configured to send second request information to the remote device, where the second request information includes the remote control instruction and the authorization token, and the authorization token is used to verify validity of the remote control instruction.

According to a ninth aspect, an authorization token apparatus for remote control is provided. The apparatus includes at least one processor and a memory, the at least one processor is coupled to the memory, and is configured to read and execute instructions in the memory. The apparatus is configured to perform the methods according to the foregoing aspects.

According to a tenth aspect, a computer-readable medium is provided. The computer-readable medium stores program code. When the computer program code is run on a computer, the computer is enabled to perform the methods according to the foregoing aspects.

According to an eleventh aspect, a chip is provided. The chip includes at least one processor and a memory. The at least one processor is coupled to the memory, and is configured to read and execute instructions in the memory. The apparatus is configured to perform the methods according to the foregoing aspects.

According to a twelfth aspect, a vehicle is provided. The vehicle includes at least one processor and a memory. The at least one processor is coupled to the memory, and is configured to read and execute instructions in the memory. The processor in the vehicle is configured to perform the methods according to the foregoing aspects.

DESCRIPTION OF EMBODIMENTS

Figure 1:
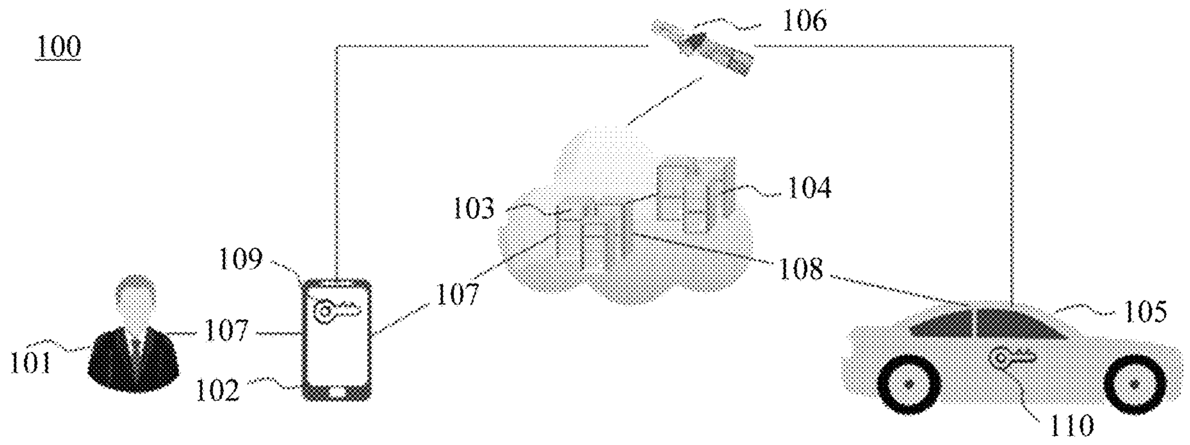
FIG. 1 shows a remote control system 100 according to an embodiment of this application.

The following describes technical solutions of this application with reference to accompanying drawings.

To facilitate understanding of embodiments of this application, terms used in embodiments of this application are first described.

(1) APP: An application (APP) is an application on a terminal device such as a smartphone.

(2) GNSS: A global navigation satellite system (GNSS) is a space-based radio navigation and positioning system that provides users with all-weather three-dimensional coordinates, speed, and time information at any place on the Earth's surface or near-Earth space.

(3) MAC: A message authentication code (MAC) is a small segment of information that is generated by using an algorithm and that is used to check integrity of a message segment and perform identity authentication. The message authentication code can be used to check whether the content has been changed during message transmission, regardless of whether the change is caused by an unexpected or intentional attack. In addition, the message authentication code can be used for identity authentication of the message source, to confirm the message source.

(4) DTLS: Datagram transport layer security (DTLS) is an extension that is based on an architecture of an existing transport layer security (TLS) protocol and that is used to support the User Datagram Protocol (UDP), that is, the datagram transport layer security protocol is a version of TLS that supports data packet transmission.

(5) IOT: The Internet of Things (IOT) is a system that interconnects computing devices, machines, and digital machines. The Internet of Things has a universal unique identifier and is capable of transmitting data over the network, without the need for interaction between people or between people and devices. The IoT digitizes the real world and is widely used.

(6) Long-term task authorization token: An authorization token whose authorization token validity period is longer than a threshold is defined as a long-term task authorization token. A long-term task authorization token meets the following condition: Validity period end time of the token (VALIDITY_EXPIRATION_TIME)−Issuance time (ISSUE_TIME)>=Duration threshold of a long-term authorization token (which is configurable, for example, 12 hours).

(7) Long-term task authorization token whitelist: A collection of valid long-term task authorization token IDs, which is protected by a signature of an issuer. Based on validity verification of a common authorization token, validity verification of a long-term task authorization token also needs to ensure that the authorization token ID is in the whitelist.

(8) Remote device: a device that a user needs to remotely control, which can be a smart vehicle, a smart home device, or the like.

(9) Authorization token content: information carried in an authorization token.

(10) Hash function: converts an input of any length into an output of a fixed length by using a hash algorithm. The output is a hash value. In other words, a hash function is used to compress a message of any length into a message digest of a fixed length.

FIG. 1 shows a remote control system according to an embodiment of this application.

As shown in FIG. 1, a user 101 may be an owner or an authorized person of a remote device 105, and is allowed to control the remote device 105 by using a terminal remote control APP 102. The terminal remote control APP 102 may be installed on a terminal device such as a mobile phone, and the user 101 may remotely view, operate, and manage the remote device 105 by using the APP 102. A device management system 103 may be deployed on a cloud or a server, and can support access from the terminal remote control APP 102 and the remote device 105, and serve the terminal remote control APP 102 and the remote device 105.

In one embodiment, the device management system 103 is operated and maintained by operation and maintenance personnel of an operator or a device manufacturer. After the remote device 105 accesses the device management system 103, the device management system 103 may perform centralized management on the remote device 105. In an actual operating process, the user 101 may directly or indirectly deliver a command to the remote device 105 by using the device management system 103, to control the remote device 105 to operate.

A key management system 104 is responsible for distributing keys to the terminal remote control APP 102 and the remote device 105. The key management system 104 may be an independent system, or may be integrated into the device management system 103. The key management system 104 may be deployed on a cloud, or may be deployed on a special-purpose server. This is not limited in this embodiment of this application.

A device owner or an authorized person of the remote device 105 may locally control the remote device 105, or may remotely control the remote device 105 by using the terminal remote control APP 102. The remote device 105 may be directly managed by the device owner or the authorized person.

The remote device 105 may be an intelligent device such as an intelligent vehicle or a smart home device. When the remote device 105 is an intelligent vehicle, a remote control instruction delivered by the device management system 103 may be an instruction for opening/closing a door. After receiving the instruction for opening/closing a door, the remote device 105 may execute the instruction, so that a user can remotely control an open/closing state of the door of the vehicle. The instruction delivered by the device management system 103 may alternatively be an instruction for opening/closing a window of the vehicle. The remote device 105 receives the instruction for closing/opening a window of the vehicle, and may execute the instruction, so that the user can remotely control an open/closing state of the window of the vehicle. The instruction delivered by the device management system 103 may alternatively be an instruction for turning on/off a vehicle light. The remote device 105 receives the instruction for turning on/off a vehicle light, and may execute the instruction to remotely control turning on/off the vehicle light. When the remote device 105 is a smart home device, the remote control instruction delivered by the device management system 103 may be an instruction for opening/closing a curtain. After the remote device 105 executes the instruction, the user may remotely control an opening/closing state of the curtain at home. The remote control instruction delivered by the device management system 103 may also be turning on/off sound. After the remote device 105 executes the instruction, the user may remotely control the turn-on/turn-off state of the sound at home, so as to control music playing.

A time synchronization system 106 may provide time synchronization for the terminal 102, the device management system 103, and the remote device 105, so as to ensure that the remote control system 100 runs properly. Time synchronization may be performed by using the GNSS, or may be performed in another manner. This is not limited in this embodiment of this application.

The communication link 107 may be a communication link between the terminal remote control APP 102 and the device management system 103. By using the link, the terminal remote control APP 102 accesses the device management system 103 to remotely control the remote device 105. The device management system 103 may authenticate and authenticate the terminal remote control APP 102, so that a secure transmission channel, for example, an HTTPS channel, is established between the device management system 103 and the terminal remote control APP 102, to ensure communication security.

The communication link 108 may be a communication link for the remote device 105 to access the device management system 103. The device management system 103 may manage and control the remote device 105 through the line. The remote device 105 performs authentication and authentication with the device management system, and establishes a secure transmission channel, for example, a DTLS channel, to ensure communication security.

A user signature key 109 may be allocated by the key management system 104, and the authorization token signature may use a message authentication code MAC based on a symmetric key, a digital signature algorithm based on an asymmetric key, or the like. When the authorization token is signed by using a message authentication code MAC based on a symmetric key, the user signature key 109 is the same as the remote device signature verification key 110; or when the authorization token is signed by using a digital signature algorithm based on an asymmetric key, the user signature key 109 is a private key of the user 101.

The remote device signature verification key 110 may be allocated by the key management system 104, and the authorization token signature may use a message authentication code MAC of a symmetric key, a digital signature algorithm of an asymmetric key, or the like. When the authorization token is signed by using a message authentication code MAC based on a symmetric key, the user signature key 109 is the same as the remote device signature verification key 110; or when the authorization token is signed by using a digital signature algorithm based on an asymmetric key, the user signature key 109 is a public key of the user 101.

Figure 2:
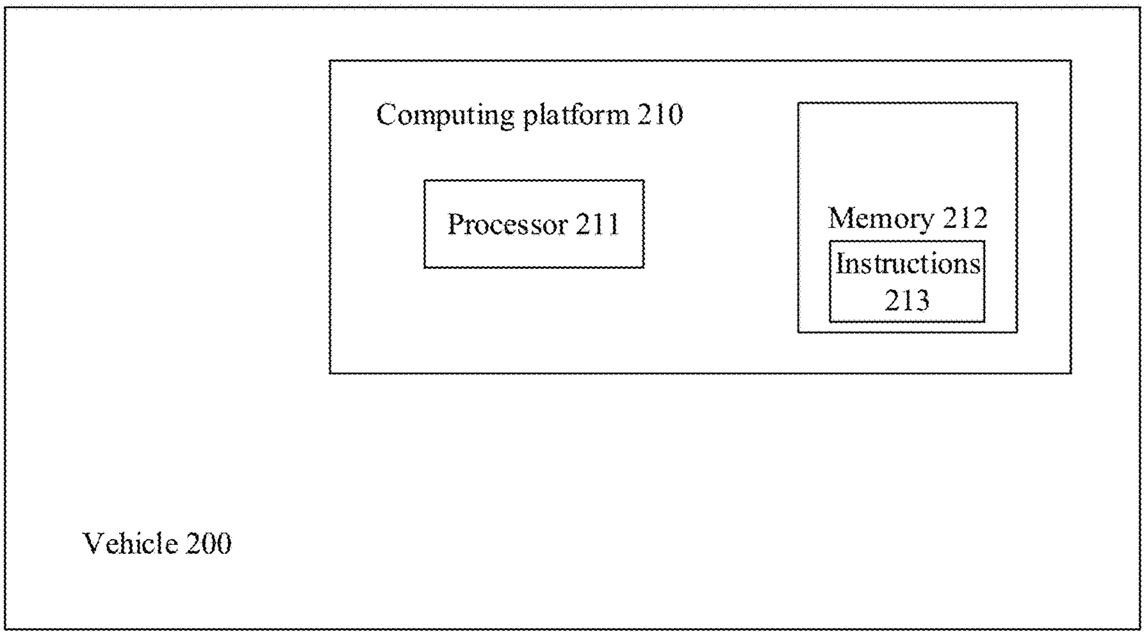
FIG. 2 is a schematic diagram of a remote device according to an embodiment of this application.

FIG. 2 is a schematic diagram of an example of a remote device according to an embodiment of this application. The vehicle 200 shown in FIG. 2 may be an example of the remote device 105 in FIG. 1.

The vehicle 200 may include various subsystems, such as a computing platform 210, and each subsystem may include a plurality of components.

Some or all functions of the vehicle 200 are controlled by the computing platform 210. The computing platform 210 may include at least one processor 211. The processor 211 may execute instructions 213 stored in a non-transitory computer-readable medium such as a memory 212. In some embodiments, the computing platform 210 may alternatively be a plurality of computing devices that control individual components or subsystems of the vehicle 200 in a distributed manner.

In some embodiments, the memory 212 may include the instructions 213 (for example, program logic), and the instructions 213 may be executed by the processor 211 to perform various functions of the vehicle 200. The memory 212 may also include additional instructions, including instructions for sending data to, receiving data from, interacting with, and/or controlling one or more other subsystems.

In addition to the instructions 213, the memory 212 may further store data, such as a road map, route information, a location, a direction, a speed and the like of a vehicle, and other information. Such information may be used by the vehicle 200 and the computing platform 210 when the vehicle 200 operates in an autonomous mode, a semi-autonomous mode, and/or a manual mode.

The computing platform 210 may control functions of the vehicle 200 based on inputs received from various subsystems. In some embodiments, the computing platform 210 may operate to control the vehicle 200 and the subsystems of the vehicle 200 in many aspects.

In one embodiment, one or more of the foregoing components may be installed separately from or associated with the vehicle 200. For example, the memory 212 may be partially or completely separated from the vehicle 200. The foregoing components may be communicatively coupled together in a wired manner and/or a wireless manner.

In one embodiment, the foregoing components are merely examples. During actual application, components in the foregoing modules may be added or removed based on an actual requirement. FIG. 2 should not be construed as a limitation on this embodiment of this application.

A self-driving vehicle traveling on a road, for example, the vehicle 200, may recognize an object in an environment around the vehicle to determine an amount of adjustment to a current speed. The object may be another vehicle, a traffic control device, or another type of object. In some examples, each recognized object may be considered independently, and the speed of the self-driving vehicle to be adjusted may be determined based on a feature of the object, such as a current speed and an acceleration of the object, and a spacing between the object and the vehicle.

In one embodiment, the vehicle 200 or a sensing and computing device associated with the vehicle 200 (for example, a computing system 211 or the computing platform 210) may predict a behavior of the identified object based on the feature of the identified object and a state of the surrounding environment (for example, traffic, rain, ice on the road, etc.). In one embodiment, all the recognized objects depend on behaviors of each other, and therefore all the recognized objects may be considered together to predict a behavior of a single recognized object. The vehicle 200 can adjust the speed of the vehicle 200 based on the predicted behavior of the identified object. In other words, the self-driving vehicle can determine, based on the predicted behavior of the object, a stable state (for example, accelerated, decelerated, or stopped) to which the vehicle needs to be adjusted. In this process, another factor may also be considered to determine the speed of the vehicle 200, for example, a horizontal location of the vehicle 200 on a road on which the vehicle travels, curvature of the road, and proximity between a static object and a dynamic object.

In addition to providing an instruction to adjust the speed of the self-driving vehicle, the computing device may further provide an instruction to modify a steering angle of the vehicle 200, so that the self-driving vehicle follows a given track and/or keeps safe horizontal and vertical distances from an object near the self-driving vehicle (for example, a car in an adjacent lane of the road).

The vehicle 200 may be a car, a truck, a motorcycle, a public vehicle, a boat, an airplane, a helicopter, a lawn mower, a recreational vehicle, a playground vehicle, a construction device, a trolley, a golf cart, a train, or the like. This is not limited in this embodiment of this application.

Currently, in a common remote control solution, a user may directly or indirectly deliver a command to a remote device by using a device management system, to control the remote device to operate.

Figure 3:
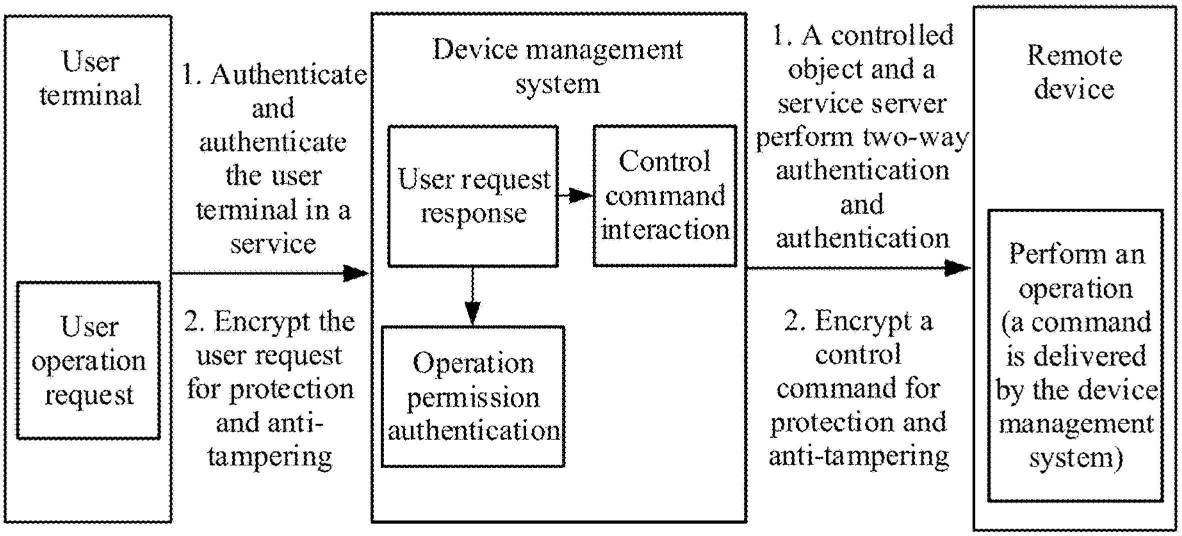
FIG. 3 shows a remote control solution according to an embodiment of this application.

FIG. 3 shows a remote control solution. The remote control solution in FIG. 3 may be applied to the remote control system 100 in FIG. 1.

As shown in FIG. 3, the remote control solution may be divided into two phases: interaction between a user terminal and a device management system, and interaction between the device management system and a remote device. In this remote control solution, authentication, authentication, and communication link security protection are implemented between the user terminal and the device management system. In addition, authentication, authentication, and communication link protection are implemented between the device management system and remote devices. In this way, a user can deliver a command to the remote device through the device management system, so as to remotely control the device.

However, in this solution, a prerequisite for secure running is that the device management system is secure and reliable, that is, the device management system is secure and the O&M personnel are reliable. The remote device cannot verify the security of the device management system, and cannot determine whether the received remote control instruction is authorized by the user. Once the device management system is attacked, or the operation and maintenance personnel do not follow regulations, and attack the remote device, the privacy, property, and life of the user are infringed.

For example, the device management system may be attacked by a hacker. The hacker can intrude the device management system to steal and tamper with the remote control instruction of the user. The remote device cannot identify whether the remote control instruction is authorized by the user. Once the remote device executes the remote control instruction tampered by the hacker, the user's property may be lost.

For another example, the operation and maintenance personnel of the device management system may perform an operation beyond the scope of their duties, and consequently, the remote control instruction does not meet the operation intention of the user. Because the remote device cannot identify whether the remote control instruction meets an authorization scope of the user, once the remote device executes the remote control instruction that does not meet the operation intention of the user, privacy and property security of the user cannot be ensured.

Figure 4:
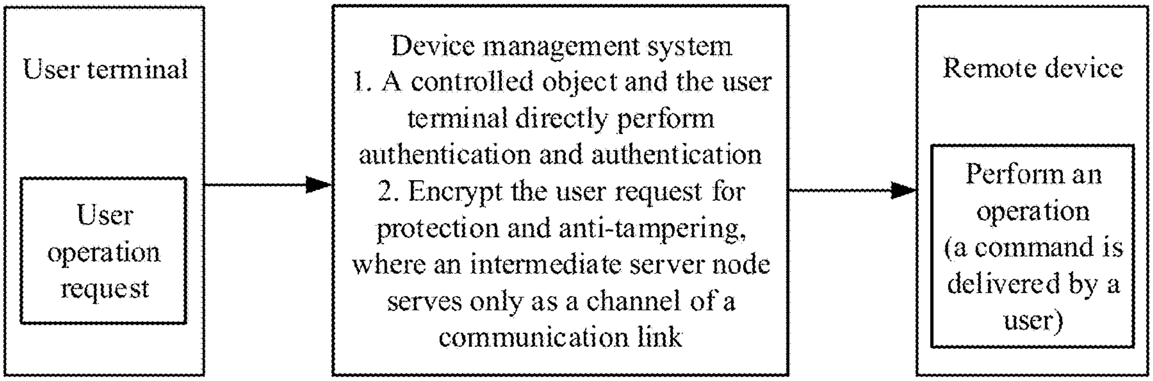
FIG. 4 shows another remote control solution according to an embodiment of this application.

FIG. 4 shows another remote control solution. The remote control solution in FIG. 4 may be applied to the remote control system 100 in FIG. 1.

As shown in FIG. 4, in the remote control solution, authentication, authentication, and communication link encryption are directly implemented between a user terminal and a remote device. The device management system serves only as a channel of a communication link and does not participate in service processing. In the remote control solution, because the device management system does not need to intervene in a processing process such as authentication, flexibility of the remote control solution can be improved. However, because the device management system cannot actively trigger operation and maintenance, when a user controls a remote device, the solution cannot intelligently optimize a control command and a parameter, and cannot support an automatic management capability.

It can be learned that in the remote control solutions in FIG. 3 and FIG. 4, a balance between security and flexibility of the remote control system cannot be achieved.

An embodiment of this application provides a remote control method. A terminal device may issue a signature-protected authorization token based on operation content of a user. The remote device verifies the signature of the authorization token, to check whether the remote control instruction is within the authorization token range, so as to ensure that the remote control instruction is authorized by the user. In this way, the remote control instruction delivered by the device management system is consistent with an intention of the device owner or authorized manager, and the security threats to remote devices caused by attacks on the device management system or improper operations of O&M personnel are reduced.

Figure 5:
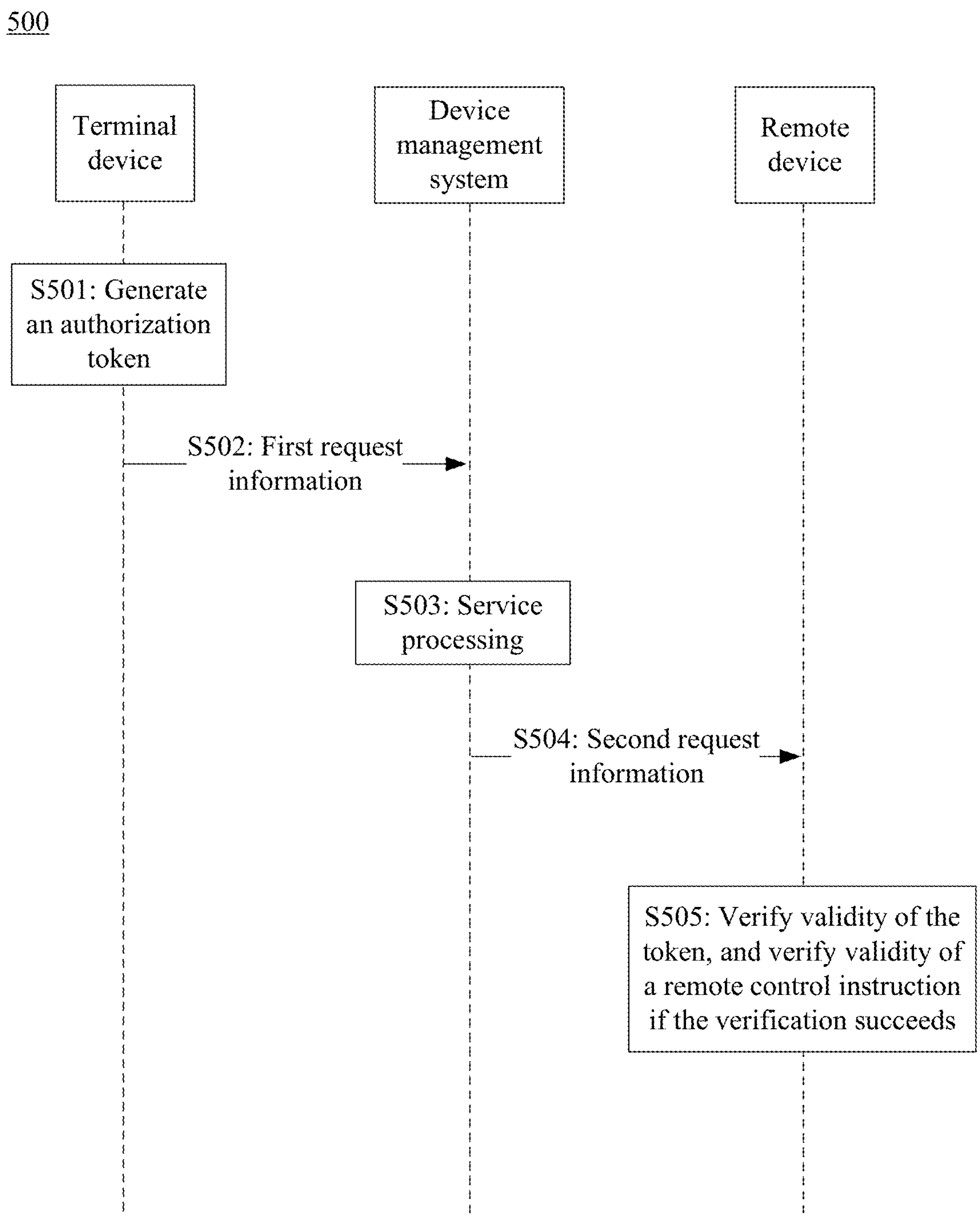
FIG. 5 shows a remote control method 500 according to an embodiment of this application.

FIG. 5 shows a remote control authorization token method 500 according to an embodiment of this application. The method may be applied to the remote control system 100 in FIG. 1. The method 500 may include the following operations.

S501: Obtain an authorization token.

In one embodiment, the authorization token may be obtained in a plurality of different manners.

For example, the authorization token may be obtained from a device management system (for example, the device management system 103 in FIG. 1). In this manner, the authorization token obtained by a terminal device is a long-term authorization token, and the terminal device may verify validity of the long-term authorization token.

For another example, the authorization token may be generated by the terminal device (for example, the terminal remote control APP 102 in FIG. 1). When the authorization token is generated by the terminal device, the generating the authorization token may include two operations: generating token content (TOKEN_CONTENT) and generating token signature (TOKEN_SIGNATURE) information.

Generating the token signature information includes two operations: generating signature data (SIGNATURE) and generating a token signature (TOKEN_SIGNATURE).

It should be understood that the signature data may be data for generating the token signature, and the signature data may be combined with a signature algorithm to obtain the token signature information.

The signature data may be generated by using the following two methods.

Method 1: message authentication code MAC algorithm based on a symmetric key

Input: authorization token content (TOKEN_CONTENT)

User signature key (MAC_KEY)

Output: signature data (SIGNATURE_DATA)

Processing process:

$$\text{SIGNATURE\_DATA} = MAC(\text{TOKEN\_CONTENT}, \text{MAC\_KEY})$$

It should be understood that the MAC algorithm may be a security message authentication code MAC such as an HMAC or a CMAC. This is not limited in this embodiment of this application.

Method 2: Digital signature algorithm based on an asymmetric key

Input: authorization token content (TOKEN_CONTENT)

User signature key (MAC_KEY)

Output: signature data (SIGNATURE)

Processing process:

$$\text{SIGNATURE\_DATA} = \text{Signature}(\text{TOKEN\_CONTENT}, \text{MAC\_KEY})$$

It should be understood that a used digital signature algorithm may be a universal algorithm in the industry, such as RSA, DSA, or ECDSA. This is not limited in this embodiment of this application.

The token signature information may be generated by using the following formula:

$$\text{TOKEN\_SIGNATURE} = \text{Signature algorithm} \mid \text{SIGNATURE\_DATA}$$

The generation of the authorization token mainly includes two operations: generating authorization token content and generating authorization token signature information, that is, $$\text{AUTHORIZATION\_TOKEN} = \text{TOKEN\_CONTENT} \mid \text{TOKEN\_SIGNATURE}.$$

In one embodiment, the authorization token content may include at least one of a token ID, an issuer identifier, an authorized-object identifier, an authorization content list, an issuance time, a validity period start time, and a validity period end time. The authorization list may include at least one of a controlled-object identifier, an operation, and a key parameter.

The issuer identifier is a user identifier, and the remote device may load a key of the token signature according to the identifier. The authorized-object identifier is a device management system ID. The controlled-object identifier is a remote device ID. The operation is an operation of remote control or a type of operation with a same security level. The key parameter is a parameter that is related to core interests such as life and property security of the user and that is involved in remote control. The issuance time is a time when the authorization token is issued. The validity period start time is the start time of the validity period of the authorization token. The validity period end time is the end time of the validity period of the authorization token.

The authorization token signature information may include signature data, or the authorization token signature information may include signature data and a signature algorithm. The signature algorithm is an algorithm used to encrypt the authorization token; and the signature data means a data result obtained through encryption by using the signature algorithm.

The authorization token content and the authorization token signature may be changed according to an actual requirement. For example, the authorization token may include a part of the authorization token content. For another example, the authorization token signature may include only signature data. For another example, additional cryptographic measures such as a secondary token signature may be performed on the authorization token.

It should be understood that the authorization token carries the signature algorithm because the system may support a plurality of signature algorithms. If the system cannot directly obtain the algorithm carried in the token, the system needs to spend time in performing verification, which causes a waste of resources. Therefore, the signature algorithm information needs to be carried in the authorization token signature. Alternatively, when a pre-negotiated signature algorithm is used, or a signature algorithm obtained based on information is used, the authorization token may not carry the signature algorithm.

In this embodiment of this application, the authorization token content of the generated authorization token may be flexibly adjusted according to an actual requirement, to adapt to different application scenarios of the authorization token. In addition, the generated authorization token may be signed and/or encrypted to ensure secure use of the authorization token.

In a possible implementation, operation S501 may further include: obtaining a whitelist, and verifying validity of the whitelist.

In one embodiment, when remote control involves a long-term task, a feature of the long-term task is that the task may be canceled. In this case, the authorization token also needs to be revoked synchronously. Therefore, a mechanism is needed to prevent use of the revoked authorization token without permission. In this embodiment of this application, the whitelist is deployed to cooperate in validity verification of the authorization token. The whitelist solution may also be replaced with a blacklist solution, and revoked tokens are listed in the blacklist, so as to ensure secure use of the authorization token.

In one embodiment, the whitelist may include whitelist content and whitelist signature information. The whitelist content may include at least one of a whitelist ID, an issuer identifier, an authorized-object identifier, a controlled object, an authorization token ID list, and an issuance time. The whitelist signature information may include signature data, or the whitelist signature information may include signature data and a signature algorithm.

The whitelist ID is a unique identifier of the whitelist issued by the user. The issuer identifier is a whitelist issuer ID. The authorization token ID list is a valid authorization token list issued by the user. The issuance time is a time when the whitelist is issued. The signature algorithm is an algorithm used to encrypt the whitelist; and the signature data means a data result obtained through encryption by using the signature algorithm.

In this embodiment of this application, content of the whitelist may be flexibly adjusted according to an actual requirement, to adapt to different whitelist application scenarios. For example, the whitelist may include a part of content of the whitelist. For another example, the signature data of the whitelist may be encrypted to ensure secure use of the whitelist.

In a possible implementation, the verifying validity of the whitelist includes at least one of the following verifications: verifying whether a whitelist issuer is valid, verifying whether a whitelist-authorized object is valid, verifying whether a whitelist-controlled object is valid, and verifying consistency of a whitelist signature.

In this embodiment of this application, to support use or revocation of the long-term task authorization token, the whitelist is deployed in the first request information, so that the remote device subsequently verifies whether authorization token content is in the whitelist, thereby ensuring secure use of the authorization token. In addition, the terminal device may obtain the whitelist and verify validity of the whitelist. The whitelist is used only when validity verification of the whitelist succeeds, thereby ensuring secure use of the whitelist. In addition, the whitelist solution may also be replaced with a blacklist solution, and validity of a blacklist may be verified, and the blacklist is used after the blacklist verification succeeds.

In a possible implementation, operation S501 may further include: The terminal device stores a whitelist feature value, where the whitelist feature value identifies the whitelist. The verifying validity of the whitelist includes: The terminal device verifies the validity of the whitelist by using the whitelist feature value.

The whitelist feature value records key information or fingerprint information of the whitelist, and may replace the whitelist in some scenarios. In addition, the whitelist feature value occupies small space of a device, and storage overheads of the device such as a mobile phone can be reduced. In addition, the remote device may further ensure secure use of the whitelist feature value by signing and/or encrypting the whitelist feature value.

In a possible implementation, operation S501 may further include: The terminal device obtains the whitelist feature value from a remote device; and the terminal device verifies the whitelist feature value, and the terminal stores the whitelist feature value if the verification succeeds.

Herein, the whitelist feature value may be obtained in different manners. For example, some algorithms or functions may be used to abstract some key information (key fields, bytes, and the like) from the whitelist to obtain the whitelist feature value. In one embodiment, a Hash function may be used to process the key information in the whitelist, generate a Hash function value, and use the Hash function value as the whitelist feature value. For another example, the whitelist ID may be used as a whitelist feature value.

In this embodiment of this application, the terminal device may store only the whitelist feature value, so that the terminal device does not need to store the entire whitelist, thereby reducing storage overheads of the terminal device. In a process of issuing the whitelist, the remote device feeds back the signed whitelist feature value. The terminal calculates a feature value based on the previously obtained whitelist, and compares the feature value with the feature value received from the remote device. If the feature values are the same, it indicates that the whitelist is not tampered with in the distribution process, and the whitelist is valid. In the process of re-issuing the whitelist, the terminal device obtains the whitelist from the device management system, calculates the feature value from the obtained whitelist, and compares the feature value with the feature value stored locally on the terminal device. If the feature values are the same, it indicates that the whitelist in the device management system is the latest and the whitelist is valid. In addition, the whitelist feature value may also be replaced with a blacklist feature value, and the blacklist feature value is used to verify the validity of the blacklist in the process of issuing or re-issuing the blacklist.

In a possible implementation, the whitelist feature value in operation S501 is a signed and/or encrypted whitelist feature value.

In a possible implementation, operation S501 may further include: The terminal device generates authorization token content according to a user operation, and issues the authorization token; the terminal device determines a task type of the user operation; and the terminal device determines, according to the task type of the user operation, whether to issue a new authorization token and whether to update the whitelist.

Table 1 shows an example of determining, based on a task type of a user operation, whether to issue a new token and whether to update a whitelist.

TABLE 1

| Task type | Whether to issue a new token | Updating a whitelist |
|---|---|---|
| Adding a long-term task | Issuing a new token | Whitelist update authorization token ID |
| Long-term task change involving token content adjustment | Not issued | Not updated |
| Long-term task change without involving token content adjustment or task deletion | Issuing a new token | Deleting an old authorization token ID from the whitelist Adding a new authorization token ID to the whitelist |

According to the implementation in Table 1, when an operation instruction of a user involves adding a new long-term task, to cooperate with transfer of an instruction for adding a new task, a new token needs to be issued, and an ID of the token needs to be updated in the whitelist. In this way, the whitelist carries the authorization token ID of the new task, and the remote device may execute the operation command of the user according to the updated whitelist and the new authorization token.

In another case, when the operation instruction of the user involves a long-term task change, and the task change does not involve token content adjustment, the whitelist does not need to be updated because no new token needs to be issued. In subsequent operations, the remote device only needs to execute the change operation command of the user according to the original whitelist and authorization token.

In another case, when the operation instruction of the user relates to a long-term task change or deletion task, and the task change relates to token content adjustment, a new token needs to be issued to cooperate with transfer of an instruction for the task change. In this case, the ID of the old authorization token needs to be deleted from the whitelist, and the ID of the new authorization token needs to be added to the whitelist, so as to cooperate with the adjustment of the token content.

In this embodiment of this application, it may be determined, based on a task type of a user operation, whether to issue a new token and whether to update the whitelist. The authorization token is applicable to a long-term authorization scenario, and secure use of the authorization token is ensured. In addition, it may be determined, according to the task type of the user operation, whether to issue a new token and whether to update the blacklist, so that the authorization token is adapted to different application scenarios.

In a possible implementation, operation S501 may further include: updating a key, re-issuing a whitelist and an authorization token by using the new key; and sending third request information to the device management system, where the third request information includes the re-issued whitelist and authorization token.

In one embodiment, in this case, because the terminal device updates the key, the issued authorization token and the whitelist need to be re-issued by using the updated key, and the re-issued whitelist and authorization token are sent to the device management system.

In one embodiment, before the re-issuing the whitelist and the authorization token by using an updated key, this operation may further include verifying validity of the whitelist and the authorization token by using the non-updated key.

In this embodiment of this application, in a scenario in which a key needs to be updated, the authorization token and the whitelist are re-issued by using the updated key, so that secure use of the authorization token and the whitelist is ensured. In addition, the authorization token and the blacklist may be re-issued by using a key, so that the authorization token is adapted to different application scenarios.

S502: The terminal device sends first request information to the device management system.

In a possible implementation, the first request information includes an operation request and the authorization token.

The operation request is used to instruct the device management system to send a remote control instruction to the remote device. The authorization token includes authorization token content and authorization token signature information, and is used to verify validity of the remote control instruction.

In a possible implementation, the first request information further includes a whitelist.

In a possible implementation, before the first request information carries the whitelist, the terminal device may verify validity of the whitelist, and add the whitelist to the first request information only when the validity verification of the whitelist succeeds.

In this embodiment of this application, to support use of the long-term task authorization token, when a change of the long-term task authorization token is involved, the whitelist needs to be sent to the remote device by deploying a whitelist in the first request information, so that the remote device subsequently verifies whether the authorization token content is in the whitelist, thereby preventing a revoked whitelist from being used without permission, and ensuring secure use of the token. In addition, the whitelist may be replaced with a blacklist, so that the authorization token is adapted to different application scenarios.

S503: The device management system performs service processing.

In one embodiment, in this operation, the device management system processes different operation requests received from the user, generates a corresponding remote control instruction, and sends the operation instruction to the remote device, so that the user can perform remote control.

In a possible implementation, this operation further includes: The device management system stores the authorization token and the whitelist.

In one embodiment, the device management system may store the authorization token and the long-term authorization token whitelist for subsequent use in a service.

S504: The device management system sends second request information to the remote device.

In one embodiment, the second request information may include a remote control instruction and an authorization token. The remote control instruction is used to instruct the remote device to perform a corresponding operation, and the authorization token is used to verify validity of the remote control instruction.

In a possible implementation, the second request information may further include a whitelist. After the whitelist is sent to the remote device, the remote device may update the whitelist.

S505: Verify validity of the authorization token, and verify validity of the remote control instruction by using the authorization token if the authorization token is valid.

In one embodiment, the verifying validity of the token may include at least one of the following verifications: verifying whether the device management system is consistent with the authorized-object identifier, verifying whether a controlled-object ID is consistent with a remote device identifier, verifying time validity of the token, verifying whether a signature verification key of the token issuer is configured on the remote device, and verifying consistency of a digital signature of the authorization token.

In one embodiment, the verifying validity of the remote control instruction includes at least one of the following verifications: verifying whether the remote device identifier is consistent with the controlled-object identifier in the authorization token, verifying whether the remote control instruction is within an allowed operation range of the authorization token, and verifying whether a key parameter is within a key parameter range of the authorization token.

In this embodiment of this application, validity verification may be performed on the received authorization token, and validity of the remote control instruction is verified by using the authorization token after the validity verification succeeds. The remote device executes the remote control instruction only when both verifications succeed. In this way, it can be ensured that the remote control instruction is consistent with the intention of the device owner/authorized person, and risks of privacy leakage and property loss of the user are reduced.

In a possible implementation, the second request information may further include a whitelist, and the verifying validity of the token further includes: verifying whether the authorization token ID is in the ID whitelist.

In a possible implementation, the second request information may further include a blacklist, and the verifying validity of the token further includes: verifying whether the authorization token ID is in the ID blacklist.

In this embodiment of this application, the whitelist may be issued when the authorization token is signed, and after the authorization token is successfully verified, it is determined whether the authorization token ID is in the ID whitelist, so as to ensure that the authorization token is not revoked. An authorization token can be used only after the whitelist verification succeeds. Alternatively, a blacklist may be issued when the authorization token is signed, and after the authorization token passes the verification, it may be determined whether the authorization token ID is in the ID blacklist. The authorization token ID can be used only when the authorization token ID is not in the blacklist. In the foregoing manner, it can be ensured that the authorization token is not revoked, and risks of privacy leakage and property loss of the user are reduced.

In a possible implementation, operation S505 further includes: verifying validity of the whitelist. The verifying validity of the whitelist may include at least one of the following verifications: verifying consistency between a remote device identifier and a controlled-object identifier in the whitelist, verifying whether a whitelist issuance time is less than or equal to a first threshold, and verifying consistency of a whitelist signature.

In one embodiment, the verifying whether a whitelist issuance time is less than or equal to a first threshold may be determining whether the whitelist issuance time is within a range allowed by a current-time difference of a remote device system. The first threshold represents a maximum value allowed by the current-time difference of the remote device system, and a value of the first threshold may be preset according to an actual situation.

For example, assuming that the allowed current-time difference of the remote device system is within 10 seconds, if the whitelist issuance time is 8 seconds, the whitelist issuance time meets the requirement; or if the whitelist issuance time is 12 seconds, the whitelist issuance time does not meet the requirement, and the whitelist fails to be updated.

The verifying consistency of a whitelist signature may mean verifying validity of the whitelist signature by using a key. If the whitelist signature is consistent with the key, the signature verification succeeds; or if the whitelist signature is inconsistent with the key, the signature verification fails, and the whitelist fails to be updated.

In this embodiment of this application, validity verification may be performed on the issued whitelist. By verifying consistency between the remote device identifier and the controlled-object identifier in the authorization token, verifying whether the whitelist issuance time is less than or equal to the first threshold, and verifying consistency of the whitelist signature, it is ensured that the whitelist is not attacked, thereby reducing risks of privacy leakage and property loss of the user. In addition, the solution for verifying the validity of the whitelist may also be replaced with a solution for verifying the validity of the blacklist.

In a possible implementation, operation S505 further includes: signing and/or encrypting the whitelist feature value; and the remote device sends the signed and/or encrypted whitelist feature value to the terminal device, so that the terminal device determines consistency between the issued whitelist and the whitelist received by the remote device.

In one embodiment, the remote device may calculate a whitelist feature value according to the whitelist, and sign or encrypt the feature value by using a signature key or through encryption. The signature key may be a symmetric key or a private key of the remote device. After obtaining the signed or encrypted feature value, the remote device may send the signed or encrypted whitelist feature value to the terminal device. The terminal device verifies consistency between the received feature value and the sent whitelist feature value. If the verification succeeds, the whitelist feature value is stored for subsequent verification of validity of the whitelist obtained from the device management system.

In this embodiment of this application, a whitelist feature value mechanism is provided, and the remote device may obtain a whitelist feature value from the whitelist. Because the whitelist feature value records key information or fingerprint information of the whitelist, the whitelist feature value can replace the whitelist, and the whitelist feature value occupies small space of a device, storage overheads of the device such as a mobile phone can be reduced. In addition, the remote device may further ensure secure use of the whitelist feature value by signing and/or encrypting the whitelist feature value. In addition, the whitelist feature value solution may also be replaced with the blacklist feature value solution.

The following describes the embodiments of this application in detail with reference to the processes shown in FIG. 6 to FIG. 16.

Figure 6:
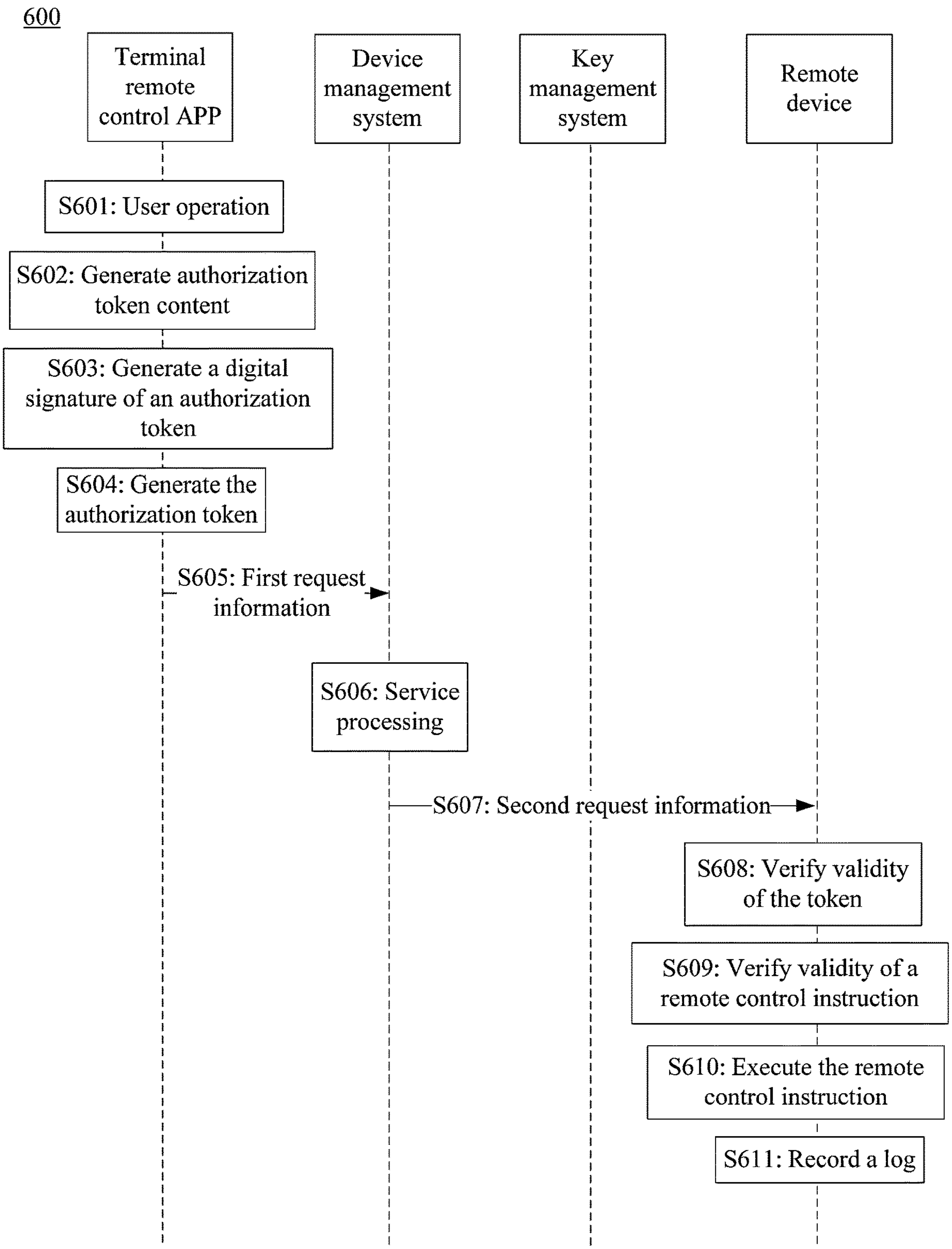
FIG. 6 is a flowchart 600 of issuing and authenticating an authorization token according to an embodiment of this application.

FIG. 6 is a flowchart 600 of issuing and authenticating an authorization token according to an embodiment of this application. The method in FIG. 6 may be applied to the remote control system 100 in FIG. 1. The method may include the following operations.

S601: A user monitors, views, and operates a remote device by using a terminal remote control APP.

S602: Generate authorization token content.

Figure 7:
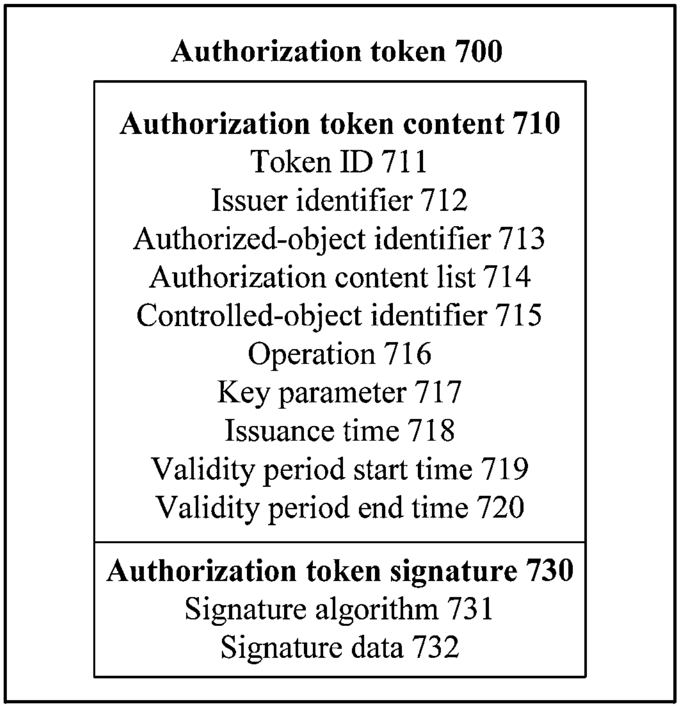
FIG. 7 shows a structure of an authorization token 700 according to an embodiment of this application.

As shown in FIG. 7, the system automatically generates authorization token content 710 (TOKEN_CONTENT) in an authorization token 700 according to an operation performed by the user on a terminal remote control APP.

The authorization token content 710 may include: a token ID 711 (TOKEN_ID), an issuer identifier 712 (ISSUER_ID), an authorized-object identifier 713 (AUTHORIZED_OBJ_ID), an authorization content list 714 (which may be a plurality of groups), a controlled identifier 715 (OBJECT_ID), an operation 716 (OPERATE), a key parameter 717 (KEY_PARAMETER), and an issuance time 718 (ISSUE_TIME), a validity period start time 719 (VALIDITY_START_TIME), and a validity period end time 720 (VALIDITY_EXPIRATION_TIME).

The remote device may load the signature key of the token according to the issuer identifier 712. The authorized-object identifier 713 may be an ID of the device management system. The controlled identifier 715 may be a remote device ID. The operation 716 may be an operation of remote control or a type of operation with a same security level. The key parameter 717 may be a parameter that is related to core interests such as life and property security of the user and that is involved in remote control.

It should be understood that the key parameter 717 may be a value, or may be a value range of a parameter. This is not limited in this embodiment of this application. When the key parameter 717 is a value range, the device management system may adjust the parameter within the value range.

The validity period start time 719 may be represented by the following formula:

$$\text{Validity period start time of a token} = \text{Current system time} - \text{Time synchronization offset (TIME\_SYN\_ERROR)}$$

The validity period end time 720 may be expressed by using the following formula:

$$\text{Validity period start time of a token} = \text{Current system time} + \text{Operation reservation time (OPERATE\_RESERVE\_TIME)} + \text{Time synchronization offset (TIME\_SYN\_ERROR)}$$

It should be understood that the operation reservation time (OPERATE_RESERVE_TIME) may be preset according to operation complexity, and the time synchronization error (TIME_SYS_ERROR) is a time synchronization error tolerable between a plurality of devices in a system. Values of the operation reservation time and the time synchronization error are not limited in this embodiment of this application.

S603: Generate a digital signature of the authorization token.

As shown in FIG. 7, the system automatically generates an authorization token signature 730 (TOKEN_SIGNATURE) in an authorization token 700 according to an operation performed by the user on the terminal remote control APP.

A manner of generating the authorization token signature 730 may be represented by using the following formula:

$$\text{Authorization token signature 730} = \text{Signature algorithm 731} \,|\, \text{Signature data 732 (SIGNATURE\_DATA)}.$$

The signature data 732 may be generated by using a message authentication code MAC algorithm based on a symmetric key or a digital signature algorithm based on an asymmetric key.

S604: Generate the authorization token.

In one embodiment, the authorization token may be obtained by combining the authorization token content 710 and the authorization token signature 730, which may be represented by using the following formula:

$$\text{AUTHORIZATION\_TOKEN} = \text{TOKEN\_CONTENT} \,|\, \text{TOKEN\_SIGNATURE}$$

It should be understood that a manner of generating the authorization token in this embodiment of this application is merely an example for description, and the authorization token may also be generated in another manner. For example, the authorization token may include only part of the authorization token content 710. For another example, the authorization token signature 730 may include only the signature data 732. For another example, an additional encryption measure such as a secondary token signature may be added to the authorization token. A manner of generating the authorization token is not limited in this embodiment of this application.

In this embodiment of this application, the authorization token may be automatically generated based on the user operation, and the token may be issued as required, to ensure a minimum authorization scope, so as to reduce risks of privacy leakage and property loss of the user. The authorization token content of the generated authorization token may be flexibly adjusted according to an actual requirement, to adapt to different application scenarios of the authorization token. In addition, the generated authorization token may be signed and/or encrypted to ensure secure use of the authorization token.

S605: The terminal remote control APP sends first request information to the device management system.

In a possible implementation, the first request information includes an operation request and an authorization token.

S606: The device management system performs service processing.

In one embodiment, the device management system processes different operation requests received from the user, generates a corresponding remote control instruction, and sends the operation instruction to the remote device, so that the user can perform remote control.

S607: The device management system sends second request information to the remote device.

In a possible implementation, the second request information includes the remote control instruction and the authorization token.

In this embodiment of this application, a communication protocol between the terminal remote control APP and the device management system and a communication protocol between the device management system and the remote device can be decoupled by using the authorization token. In addition, the device management system has sufficient freedom in the remote control algorithm, and can deliver optimal remote control parameters within the authorization scope to achieve a good remote control effect.

S608: The remote device verifies validity of the token.

S609: Verify validity of the remote control instruction.

S610: Execute the remote control instruction.

In one embodiment, after the validity of the authorization token and the validity of the remote control instruction are verified, the remote device executes the remote control instruction of the user.

Based on this, the user can remotely control the remote device.

S611: Record a log.

In one embodiment, the remote device records execution of the remote control instruction. An owner or a manager of the remote device can view an execution process and an execution result of the remote control instruction in a log.

If the remote control instruction fails to be executed, the owner or manager of the remote device may know the cause of the task execution failure by using a log record, or the remote device may feed back information to the owner or manager of the device in another manner. The owner or manager of the device may learn the cause of the task execution failure in a timely manner by using the information fed back by the remote device, and take some improvement measures to ensure that the next remote control task can be successfully executed.

In this embodiment of this application, the indication information is transferred to the remote device by issuing the authorization token by the terminal remote control APP, and the remote device may verify the token and the remote control instruction, to ensure that the remote control instruction is consistent with the intention of the owner/authorized person of the device, thereby reducing privacy leakage and property loss risks of the user.

Figure 8:
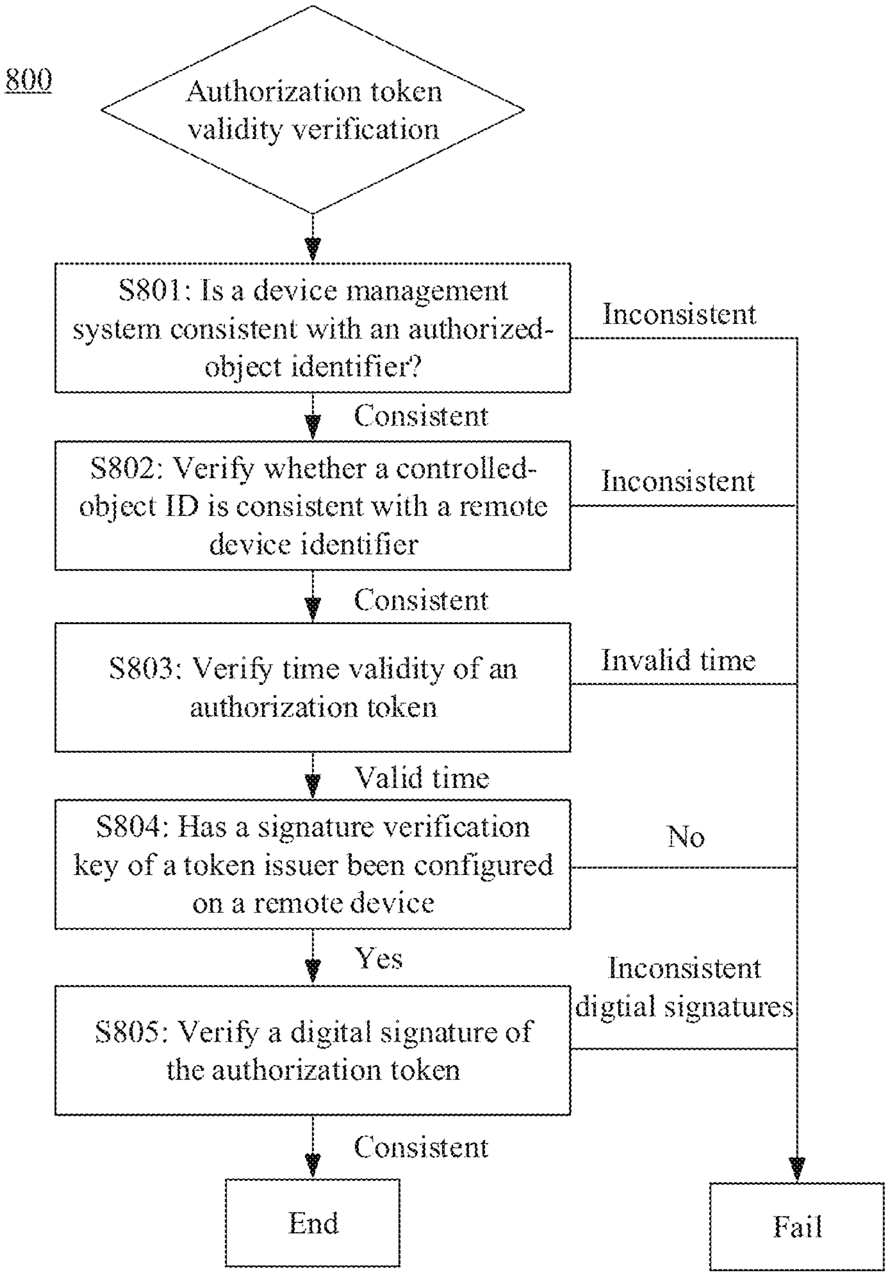
FIG. 8 is a flowchart 800 of verifying validity of an authorization token according to an embodiment of this application.

FIG. 8 is a flowchart 800 of verifying validity of an authorization token according to an embodiment of this application. The method 800 may be applied to validity verification of an authorization token in FIG. 6. As shown in FIG. 8, the method 800 may include the following operations.

S801: Verify whether a device management system is consistent with an authorized-object identifier.

In one embodiment, consistency between the device management system of a delivered remote control instruction and an authorized-object identifier (AUTHORIZED_OBJ_ID) is verified. If the device management system and the authorized-object identifier are consistent, operation S802 is performed. If the verification fails, the remote control procedure ends.

S802: Verify whether a controlled-object ID is consistent with a remote device identifier. If the controlled-object ID is consistent with the remote device identifier, operation S803 is performed; or if the controlled-object ID is inconsistent with the remote device identifier, the remote control procedure ends.

S803: Verify time validity of the token.

In one embodiment, validity of the token time may be verified by determining whether a current system time is within a preset range.

For example, if it is determined that the current system time is earlier than or equal to the validity period end time 720 of the token, the time validity verification succeeds; or if it is determined that the current system time is later than the validity period end time 720 of the token, the verification fails, and the remote control procedure ends.

For another example, if it is determined that the current system time is later than or equal to the validity period start time 719 of the token and earlier than or equal to the validity period end time 720 of the token, the time validity verification succeeds; or if it is determined that the current system time is earlier than the validity period start time 719 of the token or later than the validity period end time 720 of the token, the verification fails, and the remote control procedure ends.

S804: Verify whether the signature verification key of the token issuer has been configured on the remote device.

In one embodiment, the remote device signature verification key that is distributed in advance may be obtained by using the issuer identifier 721 and the signature algorithm 731. If the signature verification key has been configured, operation S804 is performed. If the verification fails, the remote control procedure ends.

S805: Verify consistency of the digital signature of the authorization token.

In one embodiment, verification may be performed by using the following operations.

Input: authorization token and remote device signature verification key.

Output: whether the signature is valid.

Processing Process:

(1) The authorization token content 710, the signature algorithm 731, and the signature data 732 are obtained from the authorization token.

(2) Perform signature verification on the authorization token according to the signature algorithm 731 and the remote device signature verification key. If the authorization token signatures are consistent, the verification succeeds; or if the authorization token signatures are inconsistent, the signature verification fails, and the remote control procedure ends.

Figure 9:
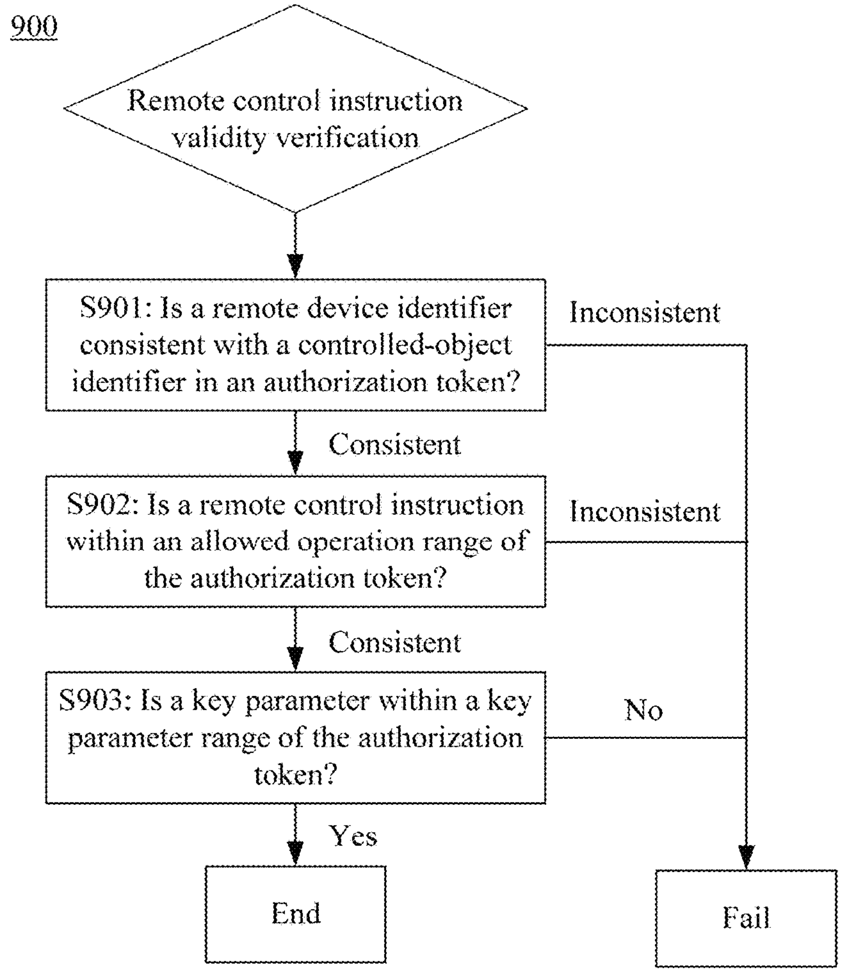
FIG. 9 is a flowchart 900 of verifying validity of a remote control instruction according to an embodiment of this application.

FIG. 9 is a flowchart 900 of verifying validity of a remote control instruction according to an embodiment of this application. The method 900 may be applied to validity verification of the remote control instruction in FIG. 6. As shown in FIG. 9, the method 900 may include the following operations.

S901: Verify whether a remote device identifier is consistent with a controlled-object identifier in an authorization token.

In one embodiment, it is verified whether a device object ID in the remote control instruction is consistent with the controlled-object identifier 715 in the authorization token. If the device object ID in the remote control instruction is consistent with the controlled-object identifier 713 in the authorization token, operation S902 is performed; or if the device object ID in the remote control instruction is inconsistent with the controlled-object identifier 713 in the authorization token, the remote control procedure ends.

S902: Verify whether the remote control instruction is within an allowed operation range of the authorization token.

In one embodiment, it is verified whether the operation instruction in the remote control instruction is consistent with the operation 716 in the authorization token or whether the operation instruction is within the range of the list of operations 716. If the operation instruction in the remote control instruction is consistent with the operation 716 in the authorization token or the operation instruction is within the range of the operation 716 list, operation S903 is performed; or if the operation instruction in the remote control instruction is inconsistent with the operation 716 in the authorization token or the operation instruction is not within the range of the operation 716 list, the remote control procedure ends.

S903: Verify whether the key parameter is within a key parameter range of the authorization token.

In one embodiment, it is verified whether the key parameter in the remote control instruction is within an allowed range of the authorization token key parameter 717. If the key parameter is within the allowed range, the validity verification of the remote control instruction succeeds; or if the key parameter is not within the allowed range, the remote control procedure ends.

The foregoing embodiment provides an authorization token implementation solution in an instant interaction scenario. In remote control application, another common application scenario is periodic control, reservation control, and authorization management, for example, functions such as scheduled vehicle backup, reserved vehicle backup, and entrusted remote diagnosis. In these scenarios, the user is offline, and the device management system initiates remote device control on behalf of the user. The user cannot issue the authorization token in real time. The user needs to issue the authorization token in advance and store the authorization token in the device management system. The validity period of the authorization token is long. Compared with an authorization token solution in an instant interaction scenario, in this scenario, not only a case in which a key is changed and an authorization token is re-signed needs to be considered, but also a case in which a user plan is changed or an authorization token is re-signed or revoked needs to be considered.

Based on this, to support an authorization token update and revocation procedure, the following embodiment describes, based on the authorization token, a long-term authorization token whitelist solution. Only the long-term authorization tokens in the whitelist solution are valid.

Figure 10:
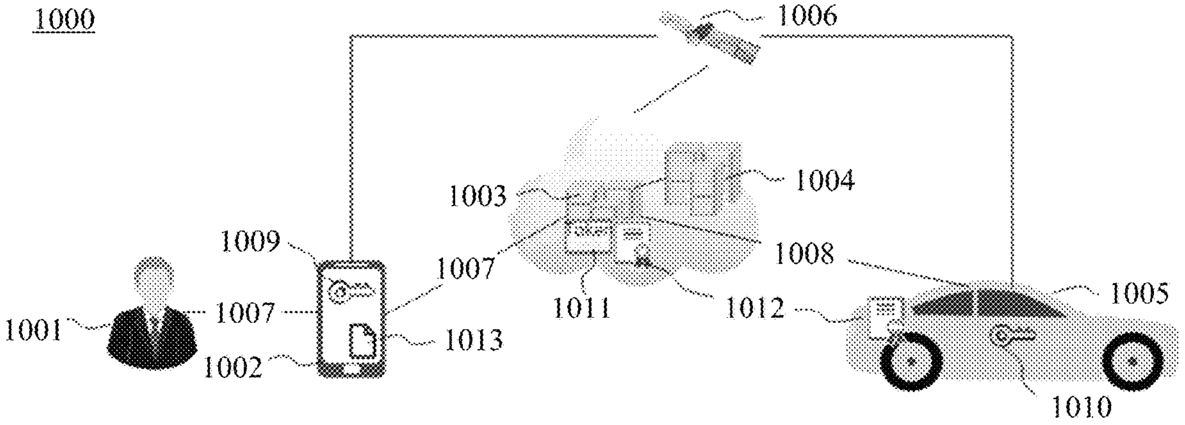
FIG. 10 shows another remote control system 1000 according to an embodiment of this application.

FIG. 10 shows another remote control system 1000 according to an embodiment of this application. The remote control system may support a remote control solution based on a long-term authorization token.

As shown in FIG. 10, a user 1001 may be an owner or an authorized person of a remote device 1005, and is allowed to control the remote device 1005 by using a terminal remote control APP 1002. The terminal remote control APP 1002 may be installed on a terminal device such as a mobile phone, and the user 1001 may remotely view, operate, and manage the remote device 1005 by using the terminal remote control APP 1002.

A device management system 1003 may be deployed on a cloud or a server, and can support access from the terminal remote control APP 1002 and the remote device 1005, and serve the terminal remote control APP 1002 and the remote device 1005.

A key management system 1004 is responsible for distributing keys to the terminal remote control APP 1002 and the remote device 1005. The key management system 1004 may be an independent system, or may be integrated into the device management system 1003. The key management system 1004 may be deployed on a cloud, or may be deployed on a special-purpose server. This is not limited in this embodiment of this application.

The remote device 1005 is owned by a device owner, and may be an intelligent vehicle, a smart home device, or the like. The device owner or an authorized person may locally operate the remote device 1005, or may remotely operate the remote device 1005 by using the terminal remote control APP 1002. The remote device 1005 may be directly managed by the device owner or the authorized person.

A time synchronization system 1006 may provide time synchronization for the terminal 1002, the device management system 1003, and the remote device 1005, so as to ensure that the remote control system 1000 runs properly. Time synchronization may be performed by using the GNSS, or may be performed in another manner. This is not limited in this embodiment of this application.

The communication link 1007 may be a communication link between the terminal remote control APP 1002 and the device management system 1003. By using the link, the terminal remote control APP 1002 accesses the device management system 1003 to remotely control the remote device 1005. The device management system 1003 may authenticate and authenticate the terminal remote control APP 1002, so that a secure transmission channel, for example, an HTTPS channel, is established between the device management system 1003 and the terminal remote control APP 1002, to ensure communication security.

The communication link 1008 may be a communication link for the remote device 1005 to access the device management system 1003. The device management system 1003 may manage and control the remote device 1005 through the line. The remote device 1005 performs authentication and authentication with the device management system, and establishes a secure transmission channel, for example, a DTLS channel, to ensure communication security.

A user signature key 1009 may be allocated by the key management system 1004, and the authorization token signature may use a message authentication code MAC based on a symmetric key, a digital signature algorithm based on an asymmetric key, or the like. When the authorization token is signed by using a message authentication code MAC based on a symmetric key, the user signature key 1009 is the same as a remote device signature verification key 1010; or when the authorization token is signed by using a digital signature algorithm based on an asymmetric key, a private key of the user 1001 is stored for issuing the authorization token signature and the long-term authorization token whitelist signature, and a public key of the remote device 1005 is stored for communication with the remote device.

The remote device signature verification key 1010 may be allocated by the key management system 1004, and the authorization token signature may use a message authentication code MAC of a symmetric key, a digital signature algorithm of an asymmetric key, or the like. When the authorization token is signed by using a message authentication code MAC based on a symmetric key, the user signature key 1009 is the same as the remote device signature verification key 1010; or when the authorization token is signed by using a digital signature algorithm based on an asymmetric key, the terminal remote control APP 1002 stores the private key of the user 1001 for issuing the authorization token signature and the long-term authorization token whitelist signature; and stores a public key of the remote device 1005 for verifying the signature of the long-term authorization token whitelist feature value returned by the remote device. In addition, the public key of the user 1001 is stored on the remote device for verifying the authorization token signature and the long-term authorization token whitelist signature; and a private key of the remote device 1005 is stored for signing a whitelist feature value in a whitelist issuance process.

After the terminal remote control APP 1002 issues an authorization token with a long validity period, the authorization token 1011 is stored in the device management system 1003 for subsequent use in a remote control service.

The long-term task authorization token whitelist 1012 is a list of authorization token IDs with a long validity period, and the list is signed and protected by using a user's key. The long-term task authorization token whitelist is stored in the device management system 1003 and the remote device 1005 after being issued.

The long-term task authorization token whitelist feature value 1013 is an identifier for globally distinguishing the whitelist. Information that can uniquely identify the whitelist may be obtained, through calculation, from the whitelist; and the whitelist feature value 1013 may be obtained by combining items such as a field, an issuer identifier, a whitelist ID, an issuance time, and fingerprint information in the whitelist. The whitelist feature value 1013 is generated by using the whitelist, to ensure that the whitelist stored by the device management system 1003, the whitelist delivered to the remote device 1005, and the whitelist issued by the terminal are consistent, so as to ensure security in the whitelist issuance and storage process.

Figure 11:
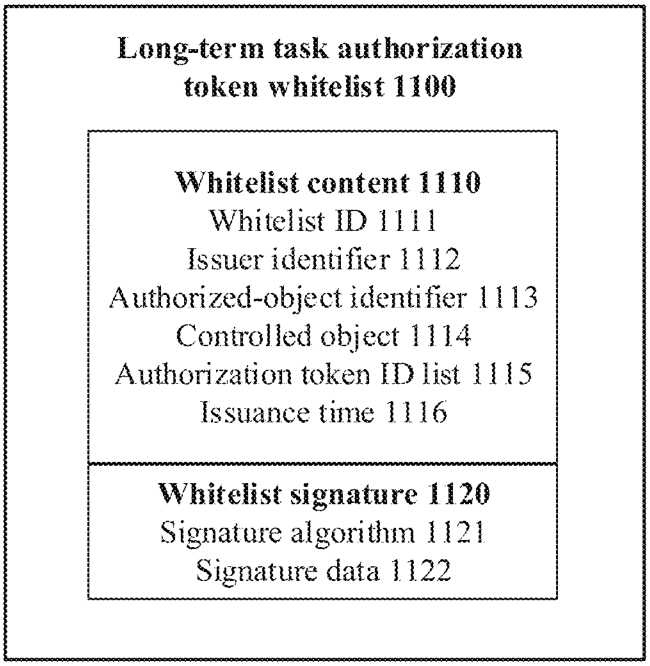
FIG. 11 is a structure 1100 of a long-term task authorization token whitelist according to an embodiment of this application.

FIG. 11 is a structure 1100 of a long-term task authorization token whitelist according to an embodiment of this application. The long-term task authorization whitelist of FIG. 11 may be applied to the remote control system 1000 in FIG. 10.

The long-term task authorization whitelist may include whitelist content 1110 and a whitelist signature 1120.

The whitelist content 1110 may include a whitelist ID 1111, an issuer identifier 1112, an authorized-object identifier 1113, a controlled object 1114, an authorization token ID list 1115, and an issuance time 1116. The whitelist signature 1120 may include a signature algorithm 1221 and signature data 1122.

The whitelist ID 1111 may be a unique identifier of the whitelist issued by the user; the issuer identifier 1112 may be a whitelist issuer ID; the authorization token ID list 1115 may be a list of authorization tokens that are issued by the user and that are not revoked; and the issuance time 1116 may be a time when the whitelist is issued. The signature algorithm 1221 may be a signature algorithm of a whitelist, for example, an algorithm such as HMAC or RSA. The signature data 1222 may mean a result of signing the whitelist based on a digital signature algorithm (or a message authentication code algorithm) by using a user's key.

It should be understood that, in this embodiment of this application, the content of the long-term authorization token whitelist and the signature are merely examples for description. Items in the content of the long-term authorization token whitelist and the signature may be adjusted based on an actual requirement, to adapt to different whitelist application scenarios. For example, the whitelist may include a part of the whitelist content. For another example, signature data of the whitelist may be encrypted, to ensure secure use of the whitelist.

Figure 12:
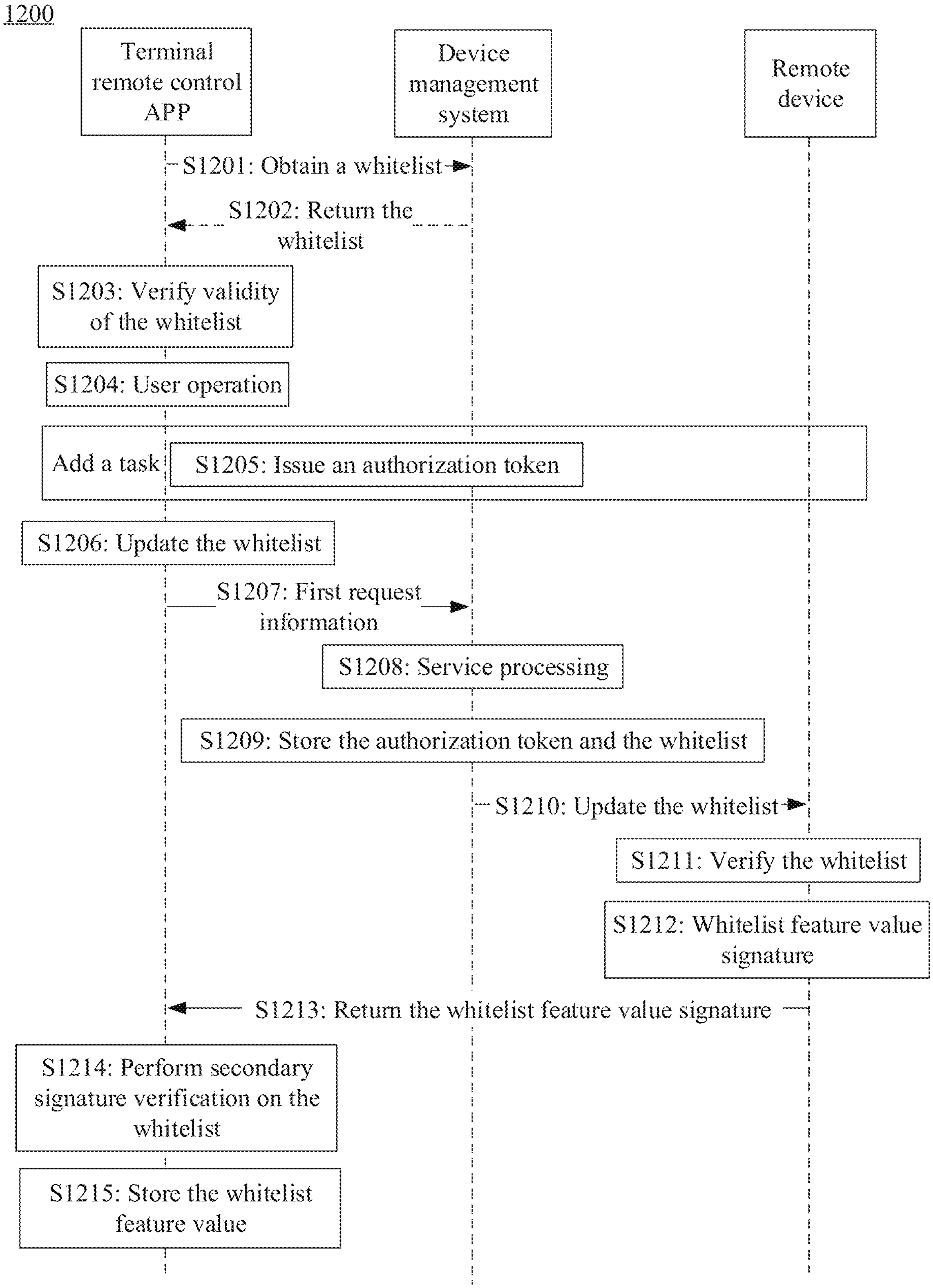
FIG. 12 is a flowchart 1200 of issuing a long-term task authorization token whitelist according to an embodiment of this application.

In this embodiment of this application, to support invalidation and revocation of the authorization token, a solution of signing a long-term task authorization token whitelist is used. Only the authorization tokens in the whitelist are valid. The remote control solutions in scenarios such as periodic control, reservation control, and authorization management are supported, FIG. 12 is a flowchart 1200 of issuing a long-term task authorization token whitelist according to an embodiment of this application. The method 1200 may be applied to the remote control system 1000 in FIG. 10. The method 1200 may include the following operations.

S1201: A terminal remote control APP sends, to a device management system, request information for obtaining a long-term authorization token whitelist.

S1202: The device management system returns a whitelist, and the terminal remote control APP obtains the long-term authorization token whitelist.

It should be understood that the long-term authorization whitelist may be stored in the device management system, or may be stored in a terminal device, or may be stored in another location. This is not limited in this embodiment of this application.

S1203: The terminal remote control APP verifies validity of the whitelist.

S1204: Determine, according to a task type of a user operation, whether to issue a new authorization token and whether to update the whitelist.

In one embodiment, when an operation instruction of the user involves adding a new long-term task, a new token needs to be issued, and an ID of the token needs to be updated in the whitelist.

When an operation instruction of the user involves a long-term task change, and the task change does not involve token content adjustment, the user change operation command needs to be executed based on the original whitelist and authorization token.

When the operation instruction of the user involves a long-term task change, and the task change involves token content adjustment, a new token needs to be issued. In this case, the ID of the old authorization token needs to be deleted from the whitelist, and the ID of the new authorization token needs to be added to the whitelist.

It should be understood that, in this embodiment of this application, the method for determining, based on a task type of a user operation, whether to issue the new authorization token and whether to update the whitelist is merely an example for description. This is not limited in this embodiment of this application.

S1205: If it is determined in operation S1204 that a new authorization token needs to be issued, issue the new authorization token in this operation; or if it is determined in operation S1204 that a new authorization token does not need to be issued, skip this operation.

S1206: If it is determined in operation S1204 that the whitelist needs to be updated, update the whitelist in this operation; or if it is determined in operation S1204 that the whitelist does not need to be updated, skip this operation.

S1207: The terminal remote control APP sends first request information to the device management system.

In one embodiment, the first request information includes a task request, an authorization token, and a long-term authorization token whitelist.

In this embodiment of this application, to support invalidation and revocation of an authorization token, a whitelist is deployed in the first request information. The remote control solutions in scenarios such as periodic control, reservation control, and authorization management are supported. This ensures security of the authorization token.

S1208: The device management system performs service processing.

In one embodiment, in this operation, the device management system processes different operation requests received from the user, generates a corresponding remote control instruction, and sends the operation instruction to the remote device, so that the user can perform remote control.

S1209: The device management system stores the authorization token and the long-term authorization token whitelist.

In one embodiment, the device management system may store the authorization token and the long-term authorization token whitelist for subsequent use in a service.

S1210: The device management system sends the long-term authorization token whitelist to the remote device, so that the remote device updates the whitelist.

S1211: After receiving the long-term authorization token whitelist, the remote device verifies validity of the whitelist, and if the verification succeeds, updates the whitelist on the remote device side; otherwise; or if the verification fails, the whitelist fails to be updated.

S1212: The remote device signs a whitelist feature value.

The whitelist feature value records key information or fingerprint information of the whitelist, and may replace the whitelist in some scenarios. In addition, the whitelist feature value occupies small space of a device, and storage overheads of the device such as a mobile phone can be reduced.

In one embodiment, the remote device may calculate the feature value from the obtained whitelist, and sign the feature value by using a signature key of the remote device. Herein, the whitelist feature value may be obtained in different manners. For example, some algorithms or functions may be used to abstract some key information (key fields, bytes, and the like) from the whitelist to obtain the whitelist feature value. In one embodiment, a Hash function may be used to process the key information in the whitelist, generate a Hash function value, and use the Hash function value as the whitelist feature value. For another example, the whitelist ID may be used as a whitelist feature value.

When the signature key of the remote device is used to sign the feature value, the used signature key may be a symmetric key or a private key of the remote device. The signature may also be replaced with encryption processing performed by the remote device on the white name feature value. The encryption processing and signing are performed to improve secure use of the whitelist feature value.

S1213: The remote device returns the whitelist feature value and the whitelist feature value signature to the terminal remote control APP.

In one embodiment, the remote device may send the signed whitelist feature value to the terminal device, so that the terminal device verifies and stores the whitelist feature value.

If encryption processing is performed on the whitelist feature value in operation S1212, this operation is that the remote device returns the encrypted whitelist feature value to the terminal remote control APP.

S1214: The terminal remote control APP performs secondary signature verification on the whitelist feature value by using the symmetric key or the public key of the remote device.

In one embodiment, the terminal remote control APP may perform secondary signature verification on the signed whitelist feature value by using a symmetric key or a public key of the remote device. If the signature verification succeeds, the whitelist feature value and a new signature thereof are stored; or if the authentication fails, the whitelist feature value is discarded or revoked. In this way, the validity of the whitelist obtained from the outside can be ensured, and the whitelist cannot be without permission.

The process of the secondary signature verification of the whitelist feature value includes: (1) verifying the whitelist feature value signature by using the symmetric key or the public key of the remote device, and performing a next operation if the verification succeeds; and (2) A whitelist feature value is generated for the whitelist sent in the first request information in S1207, and is compared with the feature value returned in S1213. If the feature values are the same, the whitelist is issued successfully; or if the features values are different, the whitelist is tampered with without permission, and a whitelist revocation process needs to be triggered.

If in S1213, the terminal remote control APP receives the whitelist feature value on which encryption processing has been performed, this operation is performing secondary authentication on the encrypted whitelist.

S1215: Store the whitelist feature value for a next verification of integrity of the whitelist obtained from the device management system.

In one embodiment, the terminal remote control APP signs or encrypts the latest whitelist feature value, and locally stores the whitelist feature value and the signature thereof.

In this embodiment of this application, the whitelist is issued when the authorization token is signed, and the validity of the whitelist is verified, so as to ensure that the whitelist is not attacked, thereby reducing risks of privacy leakage and property loss of the user. In addition, in this embodiment of this application, a mechanism of locally storing the whitelist feature value may be used to ensure validity of a whitelist obtained from the outside, prevent the whitelist from being without permission, and reduce storage overheads of the device such as a mobile phone by using the feature value mechanism.

The whitelist solution may also be replaced with a blacklist solution, and validity verification, feature value verification, and the like may be performed on a blacklist.

Figure 13:
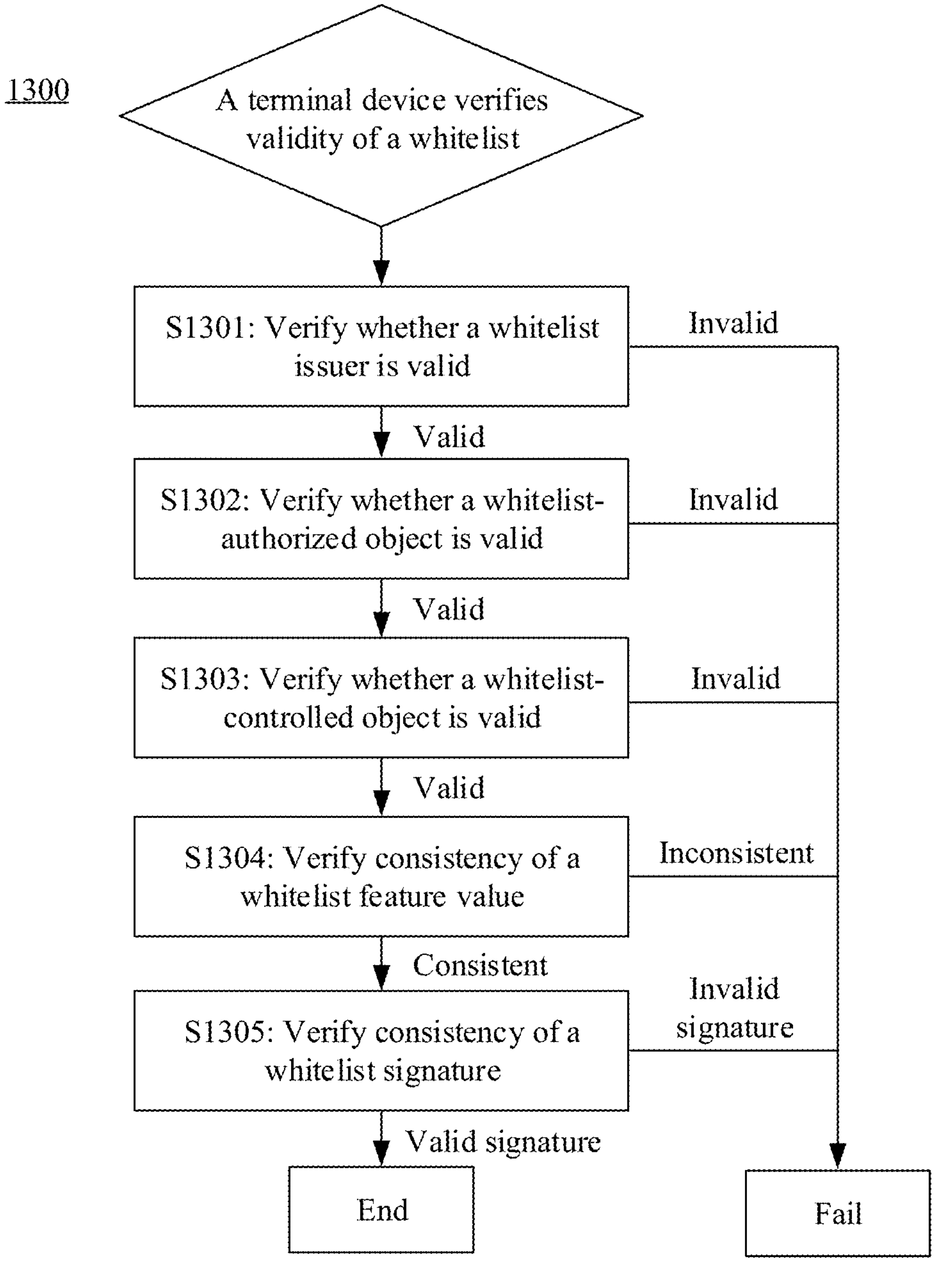
FIG. 13 is a flowchart 1300 of verifying validity of a whitelist of a terminal device according to an embodiment of this application.

FIG. 13 is a flowchart 1300 of verifying validity of a whitelist of a terminal device according to an embodiment of this application. The method 1300 may be applied to operation S1203 in a process of verifying validity of a whitelist by a terminal device in FIG. 12. As shown in FIG. 13, the method 1300 may include the following operations.

S1301: Verify whether a whitelist issuer is valid.

In one embodiment, it is verified whether the issuer identifier 1112 in the whitelist obtained from the device management system is consistent with the identity of the terminal remote control APP. If the issuer identifier 1112 is consistent with the identity of the terminal remote control APP, operation S1302 is performed; or if the issuer identifier 1112 is inconsistent with the identity of the terminal remote control APP, the whitelist is invalid, and the verification fails.

S1302: Verify whether the whitelist-authorized object is valid.

In one embodiment, it is verified whether the authorized-object identifier 1113 in the whitelist obtained from the device management system is consistent with the ID of the currently logged-in device management system. If the authorized-object identifier 1113 is consistent with the ID of the currently logged-in device management system, operation S1303 is performed; or if the authorized-object identifier 1113 is inconsistent with the ID of the currently logged-in device management system, the whitelist is invalid, and the verification fails.

S1303: Verify whether the whitelist-controlled object is valid.

In one embodiment, it is verified whether the controlled-object identifier 1113 in the whitelist obtained from the device management system is consistent with the ID of the operated remote device. If the controlled-object identifier 1113 is consistent with the ID of the operated remote device, operation S1304 is performed; or if the controlled-object identifier 1113 is inconsistent with the ID of the operated remote device, the whitelist is invalid, and the verification fails.

S1304: Verify consistency of the whitelist feature value.

In one embodiment, the verification terminal device verifies consistency between the stored feature value and the feature value that is obtained, through calculation, from the whitelist. If it is verified that the feature values of the whitelist are consistent, operation S1305 is performed; or if it is verified that the feature values of the whitelist are inconsistent, the whitelist is invalid, and the verification fails. The whitelist feature values may be protected by using a signature or through encryption, to prevent the whitelist from being tampered with.

S1305: Verify consistency of a whitelist signature.

In one embodiment, validity verification is performed on the whitelist issued by the user. If the verification succeeds, the whitelist validity verification succeeds. If the signature validity verification fails, the whitelist is invalid, and the whitelist validity verification fails.

Figure 14:
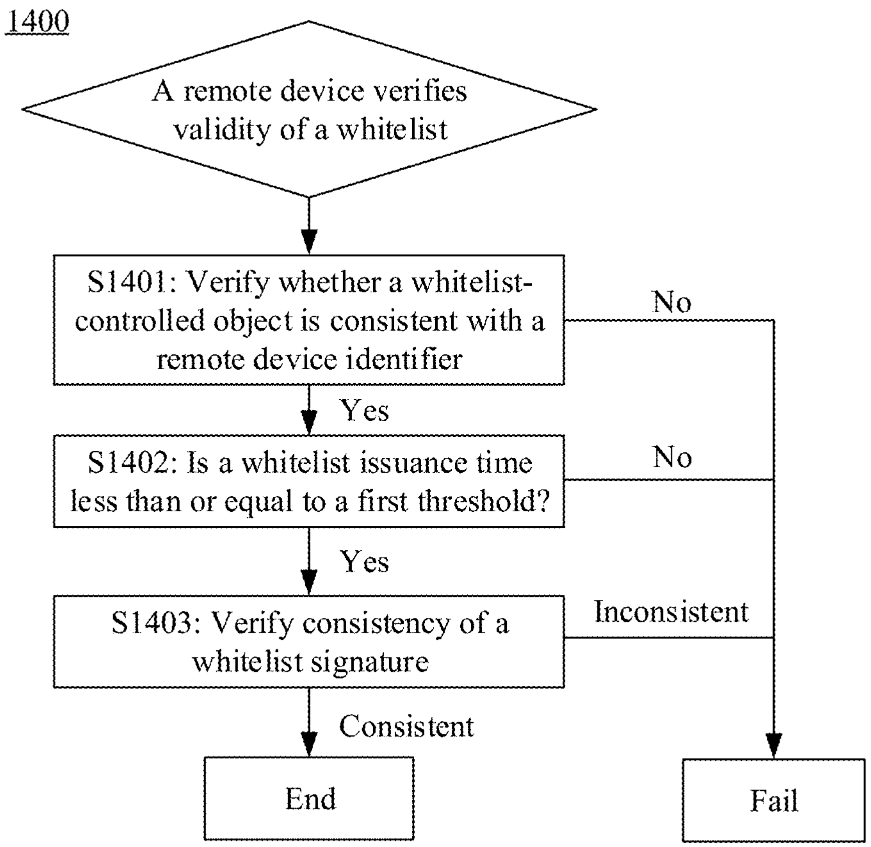
FIG. 14 is a flowchart 1400 of verifying whitelist update validity of a remote device according to an embodiment of this application.

FIG. 14 is a flowchart 1400 of verifying whitelist update validity of a remote device according to an embodiment of this application. The method may be applied to a process of verifying validity of the whitelist in operation S1211/S1212 in FIG. 12. The method 1400 may include the following operations.

S1401: Verify whether a whitelist-controlled object is consistent with a remote device identifier.

In one embodiment, the whitelist-controlled object is compared with the remote device identifier. If the controlled object is consistent with the remote device identifier, operation S1402 is performed; or if the controlled object is inconsistent with the remote device identifier, the whitelist update validity verification fails.

S1402: Verify whether a whitelist issuance time is less than or equal to a first threshold.

In one embodiment, the verifying whether the issuance time of the whitelist is less than or equal to the first threshold may be determining whether the issuance time of the whitelist is within a range allowed by a current-time difference of a remote device system.

S1403: Verify consistency of a whitelist signature.

In one embodiment, verifying the consistency of the whitelist signature may mean verifying validity of the whitelist signature by using a key. If the whitelist signature is consistent with the key, signature verification succeeds, and whitelist update succeeds; or if the whitelist signature is inconsistent with the key, signature verification fails, and whitelist update fails.

In the solution of signing the long-term task authorization token whitelist, the terminal remote control APP may need to update the key, to ensure secure use of the authorization token by the user. In this case, the issued long-term authorization token and long-term authorization token whitelist need to be re-issued.

Figure 15:
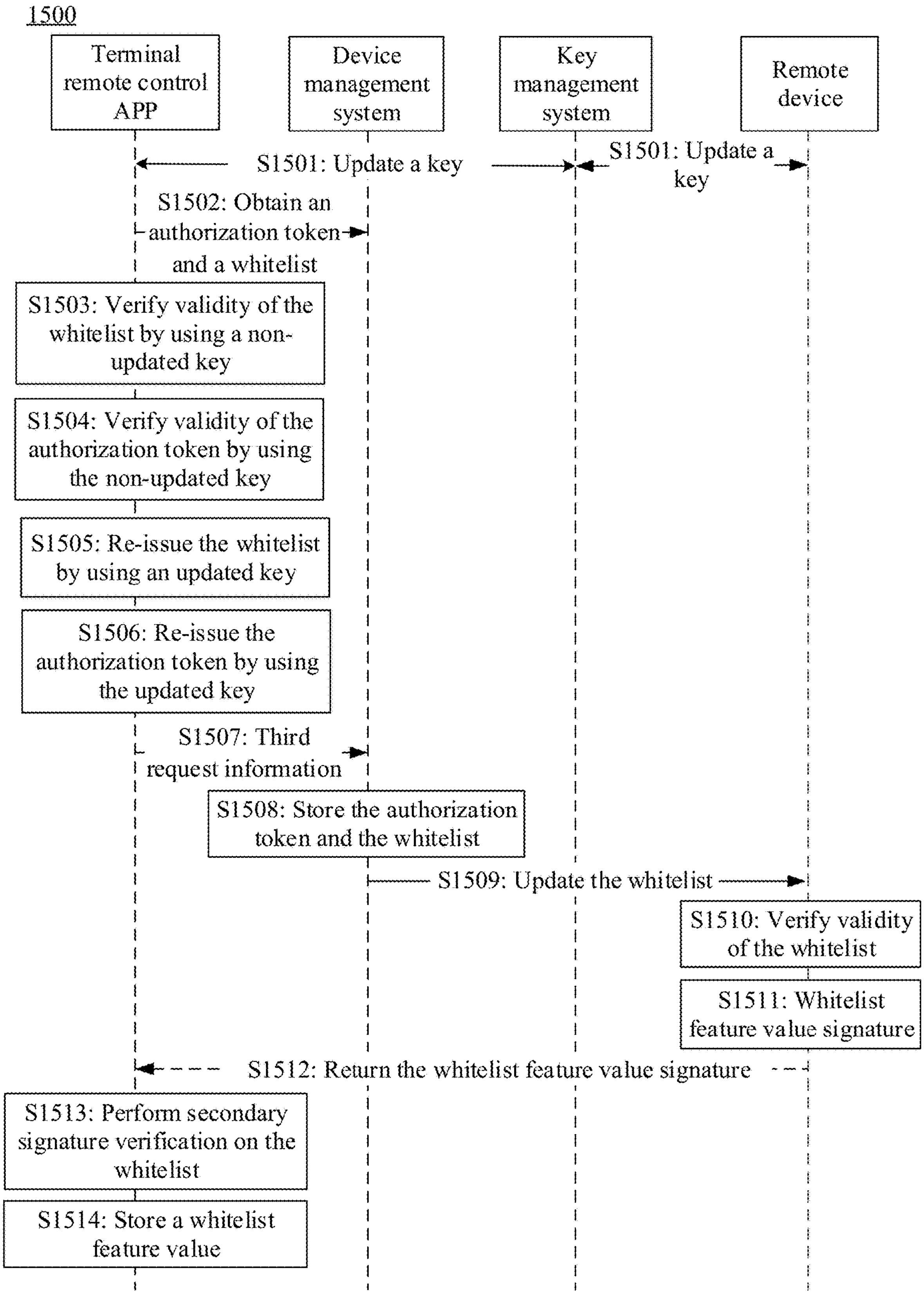
FIG. 15 is a flowchart 1500 of re-issuing an authorization token according to an embodiment of this application.

FIG. 15 is a flowchart 1500 of re-issuing an authorization token according to an embodiment of this application. The method 1500 may be applied to the remote control system 1000 in FIG. 10. The method 1500 may include the following operations.

S1501: A terminal remote control APP updates a key, and a key management system needs to update a latest key on both the terminal remote control APP and a remote device.

S1502: The terminal remote control APP obtains a long-term authorization token and a whitelist from the device management system.

S1503: The terminal remote control APP verifies validity of the obtained whitelist by using the non-updated key, where the whitelist validity verification needs to meet the following two conditions:

Consistency of the whitelist signature is ensured; and the whitelist feature value is calculated based on the whitelist obtained from the device management system, and the feature value is consistent with that stored in the terminal remote control APP.

S1504: The terminal remote control APP verifies validity of the authorization token by using the non-updated key, and keeps the authorization token ID in the authorization token ID list of the whitelist. If the validity verification succeeds, operation S1505 is performed; or if the validity verification fails, the process ends, and a long-term task needs to be re-created.

S1505: The terminal remote control APP re-issues the long-term authorization token whitelist by using an updated key.

S1506: The terminal remote control APP re-issues the long-term authorization token by using the updated key.

S1507: The terminal remote control APP sends third request information to the device management system.

In a possible implementation, the third request information includes the long-term authorization token and the long-term authorization token whitelist.

S1508: The device management system stores the authorization token and the long-term authorization token whitelist.

In one embodiment, the device management system may store the authorization token and the long-term authorization token whitelist for subsequent use in a service.

S1509: The device management sends the long-term authorization token whitelist to the remote device, so that the remote device updates the whitelist.

S1510: After receiving the long-term authorization token whitelist, the remote device updates the whitelist, and verifies validity of the updated whitelist.

In one embodiment, the verifying validity of the whitelist includes at least one of the following verifications: verifying consistency between a whitelist-controlled object and a remote device identifier, verifying whether a whitelist issuance time is less than or equal to a first threshold, and verifying consistency of a whitelist signature.

S1511: The remote device signs a whitelist feature value.

In one embodiment, the remote device may obtain, through calculation, the feature value from the obtained whitelist, and sign the feature value by using the signature key. The signature key may be a symmetric key or a private key of the remote device.

S1512: The remote device returns the whitelist feature value signature to the terminal remote control APP.

In one embodiment, the remote device may send the signed whitelist feature value to the terminal device, so that the terminal device verifies and stores the whitelist feature value.

S1513: The terminal remote control APP performs secondary signature verification on the whitelist.

In one embodiment, the terminal remote control APP may perform secondary signature verification on the signed whitelist feature value. If the signature verification succeeds, the whitelist feature value and a new signature thereof are stored; or if the authentication fails, the whitelist feature value is discarded. In this way, the validity of the whitelist obtained from the outside can be ensured, and the whitelist cannot be without permission.

The process of the secondary signature verification of the whitelist feature value includes: (1) verifying the whitelist feature value signature by using the symmetric key or the public key of the remote device, and performing a next operation if the verification succeeds; and (2) A whitelist feature value is generated for the whitelist sent in the first request information in S1507, and is compared with the feature value returned in S1512. If the feature values are the same, the whitelist is issued successfully; or if the features values are different, the whitelist is tampered with without permission, and a whitelist revocation process needs to be triggered.

S1514: Store the whitelist feature value.

In one embodiment, the terminal remote control APP signs the latest whitelist feature value, and locally stores the whitelist feature value and the signature thereof.

In this embodiment of this application, in a scenario in which a key needs to be updated, the authorization token and the whitelist are re-issued by using the new key, so that secure use of the authorization token and the whitelist is ensured. In addition, the authorization token and the blacklist may also be re-issued by using the new key, to ensure secure use of the authorization token and the blacklist.

Figure 16:
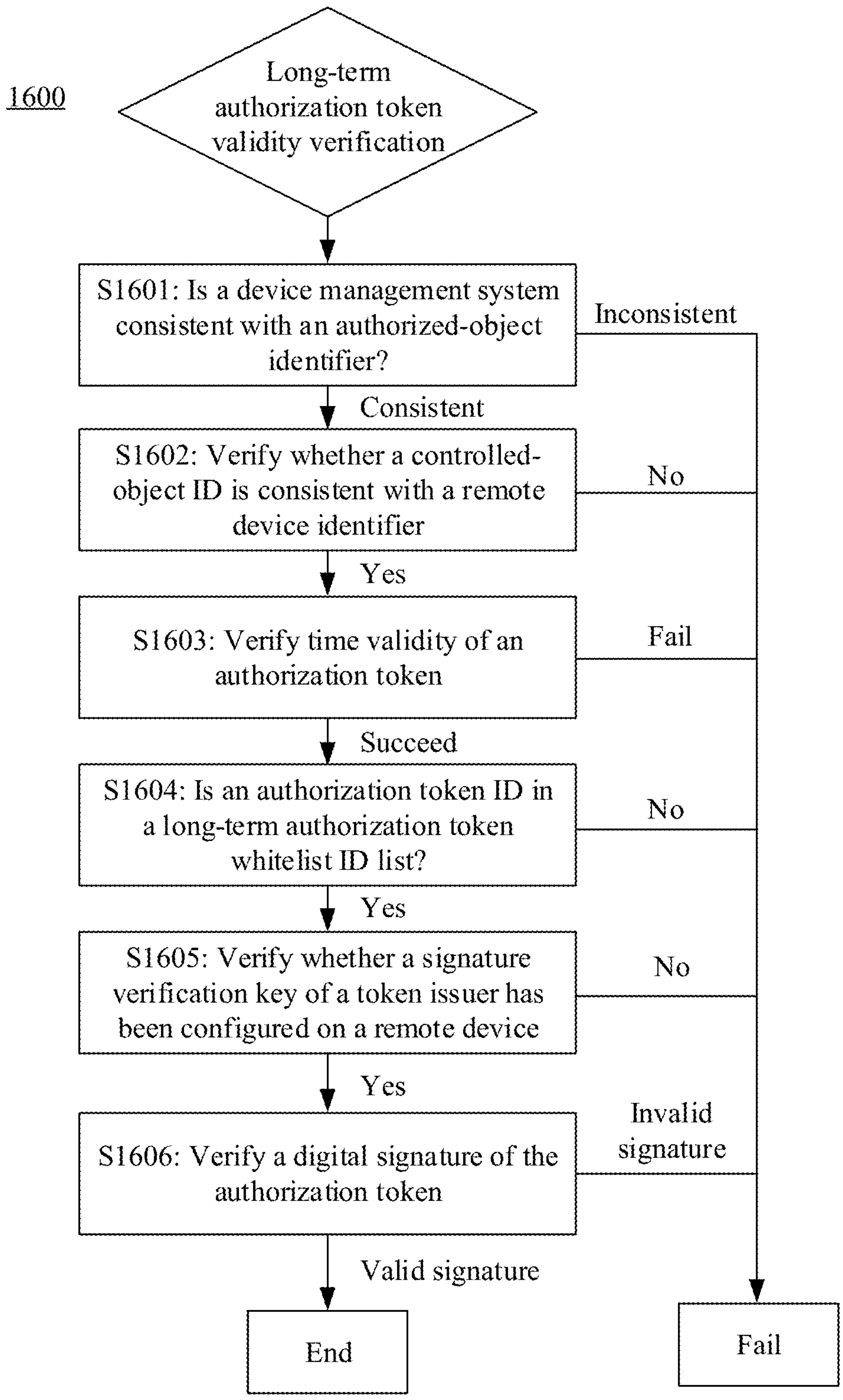
FIG. 16 is a flowchart 1600 of verifying validity of a long-term authorization token according to an embodiment of this application.

FIG. 16 is a flowchart 1600 of verifying validity of a long-term authorization token according to an embodiment of this application. In FIG. 16, operation S1604 is added based on FIG. 8, that is, it is verified whether an authorization token ID is in a long-term authorization token ID list. Operations included in the method 1600 are as follows:

S1601: Verify whether a device management system is consistent with an authorized-object identifier.

In one embodiment, consistency between the device management system of a delivered remote control instruction and an authorized-object identifier (AUTHORIZED_OBJ_ID) is verified. If the device management system and the authorized-object identifier are consistent, operation S1602 is performed. If the verification fails, the remote control procedure ends.

S1602: Verify whether a controlled-object ID is consistent with a remote device identifier.

In one embodiment, if the controlled-object ID is consistent with the remote device identifier, operation S1602 is performed; or if the controlled-object ID is inconsistent with the remote device identifier, verification fails, and the remote control procedure ends.

S1603: Verify time validity of the token.

In one embodiment, validity of the token time may be verified by determining whether a current system time is within a preset range.

For example, if it is determined that the current system time is earlier than or equal to the validity period end time 720 of the token, the time validity verification succeeds; or if it is determined that the current system time is later than the validity period end time 720 of the token, the verification fails, and the remote control procedure ends.

For another example, if it is determined that the current system time is later than or equal to the validity period start time 719 of the token and earlier than or equal to the validity period end time 720 of the token, the time validity verification succeeds; or if it is determined that the current system time is earlier than the validity period start time 719 of the token or later than the validity period end time 720 of the token, the verification fails, and the remote control procedure ends.

S1604: Check whether the authorization token ID is in an authorization token ID list 1115 of a long-term authorization token whitelist 1000. If the authorization token ID is in the list, operation S1605 is performed; or if the authorization token ID is not in the list, the verification fails.

S1605: Verify whether the signature verification key of the token issuer has been configured on the remote device.

In one embodiment, the remote device signature verification key that is distributed in advance may be obtained by using the issuer identifier 721 and the signature algorithm 731. If the signature verification key has been configured, operation S1606 is performed. If the verification fails, the remote control procedure ends.

S1606: Verify consistency of the digital signature of the authorization token.

In one embodiment, verification may be performed by using the following operations.

Input: authorization token and remote device signature verification key.

Output: whether the signature is valid.

Processing Process:

(1) The authorization token content 710, the signature algorithm 731, and the signature data 732 are obtained from the authorization token.

(2) Perform signature verification on the authorization token according to the signature algorithm 731 and the remote device signature verification key. If the authorization token signatures are consistent, the verification succeeds; or if the authorization token signatures are inconsistent, the signature verification fails, and the remote control procedure ends.

The foregoing embodiment provides a solution of signing a long-term task authorization token whitelist in a remote control application to support invalidation and revocation of the authorization token. Only the authorization tokens in the whitelist are valid. The remote control solutions in scenarios such as periodic control, reservation control, and authorization management are supported.

The whitelist solution may also be replaced with a blacklist solution. The long-term authorization token blacklist is used to replace the long-term authorization token whitelist, and the revoked token is stored in the blacklist. In a process in which the remote device verifies validity of the authorization token, if the authorization token ID is in the blacklist, the authorization token is invalid, and the verification fails. Expired authorization tokens may be deleted from the blacklist to reduce a length of the blacklist, so as to prevent the blacklist from becoming longer and longer.

It should be understood that embodiments described in this specification may be independent solutions, or may be combined based on internal logic. All these solutions fall within the protection scope of this application. For example, the remote control token method can be used independently, or may be used in combination with the long-term authorization token whitelist method. For another example, the long-term authorization token blacklist method may be used independently, or may be used in combination with the long-term authorization token whitelist method.

Figure 17:
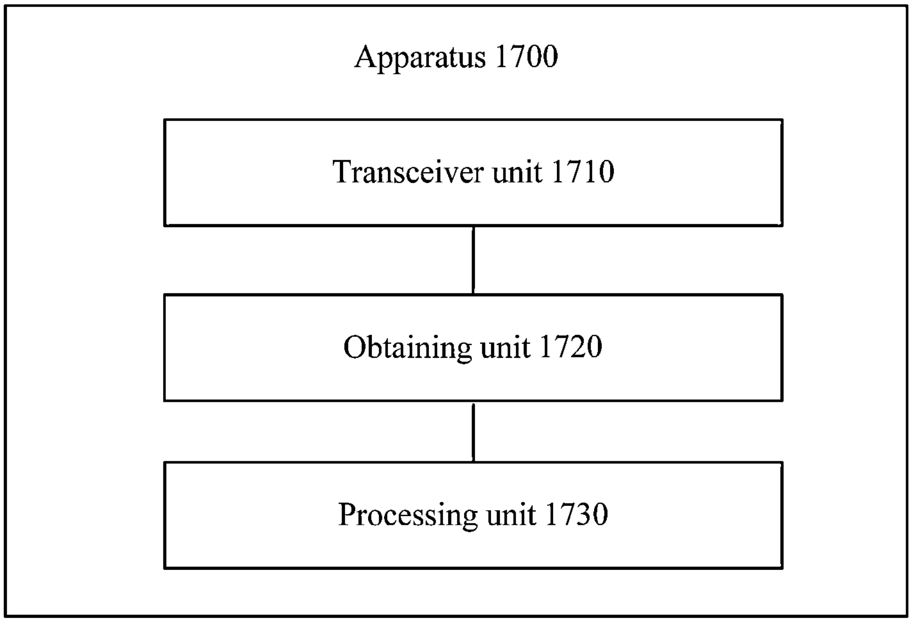
FIG. 17 shows a remote control apparatus 1700 according to an embodiment of this application.

FIG. 17 shows a remote control apparatus 1700 according to an embodiment of this application. The apparatus may be applied to the remote control system 100 in FIG. 1, and may also be applied to the remote control system 1000 in FIG. 10.

The apparatus 1700 may include a transceiver unit 1710, an obtaining unit 1720, and a processing unit 1730. The transceiver unit 1710 may implement a corresponding communication function, and the transceiver unit 1710 may also be referred to as a communication interface or a communication unit. The obtaining unit 1720 may be configured to obtain corresponding instructions and/or data, and the processing unit 1730 is configured to process data. The processing unit 1730 may read instructions and/or data a storage unit, so that the apparatus implements the foregoing method embodiments.

In one embodiment, the communication apparatus 2000 may further include a storage unit, where the storage unit may be configured to store instructions and/or data.

In a design, the apparatus 1700 is configured to perform an action performed by the terminal device or the terminal remote control APP in the foregoing method embodiments.

In a possible implementation, the apparatus 1700 includes an obtaining unit 1720 and a transceiver unit 1710. The obtaining unit 1720 is configured to obtain an authorization token, where the authorization token includes authorization token content and authorization token signature information. The transceiver unit 1710 is configured to send first request information to a device management system, where the first request information includes an operation request and the authorization token. The operation request is used to request the device management system to deliver a remote control instruction to a remote device, and the authorization token is used to cooperate in validity verification of the remote control instruction.

In one embodiment, the authorization token content includes at least one of a token ID, an issuer identifier, an authorized-object identifier, an authorization content list, an issuance time, a validity period start time, and a validity period end time. The authorization content list includes at least one of a controlled-object identifier, an operation, and a key parameter; and the authorization token signature information includes signature data or both signature data and a signature algorithm.

In a possible implementation, the first request information further includes a whitelist, and the whitelist includes whitelist content and whitelist signature information; the whitelist content includes at least one of a whitelist ID, an issuer identifier, an authorized-object identifier, a controlled object, an authorization token ID list, and an issuance time; and the whitelist signature information includes signature data or both signature data and a signature algorithm.

In a possible implementation, the obtaining unit 1720 is further configured to obtain a whitelist. The apparatus further includes a processing unit 1730, configured to verify validity of the whitelist. The processing unit 1730 is configured to perform at least one of the following verifications: verifying whether a whitelist issuer is valid, verifying whether a whitelist-authorized object is valid, verifying whether a whitelist-controlled object is valid, and verifying consistency of a whitelist signature.

In a possible implementation, the apparatus further includes a storage unit, configured to store a whitelist feature value; and the processing unit 1730 is further configured to verify validity of the whitelist by using the whitelist feature value.

In a possible implementation, the obtaining unit 1720 is further configured to obtain a whitelist feature value; the processing unit 1730 is configured to verify the whitelist feature value; and if the verification succeeds, the storage unit is configured to store the whitelist feature value.

In a possible implementation, the whitelist feature value is a signed and/or encrypted whitelist feature value.

In a possible implementation, the processing unit is further configured to perform signature verification and/or decryption on the whitelist feature value.

In a possible implementation, the processing unit 1730 in the apparatus is further configured to: generate the authorization token content, and issue the authorization token; determine a task type of a user operation; and determine, according to the task type of the user operation, whether to issue a new authorization token and whether to update the whitelist.

In a possible implementation, the processing unit 1730 in the apparatus is further configured to update a key, and re-issue a whitelist and an authorization token by using an updated key; and the transceiver unit 1710 is further configured to send third request information to the device management system, where the third request information includes the re-issued whitelist and authorization token.

In a design, the apparatus 1700 is configured to perform an action performed by the device management system in the foregoing method embodiments.

In a possible implementation, the apparatus includes a transceiver unit 1710 and a processing unit 1730. The transceiver unit 1710 is configured to receive first request information, where the first request information includes an operation request and an authorization token. The processing unit 1730 is configured to generate a remote control instruction based on the operation request, where the remote control instruction is used to instruct the remote device to execute the operation request.

In a possible implementation, the transceiver unit 1710 is further configured to send second request information to the remote device, where the second request information includes the remote control instruction and the authorization token, and the authorization token is used to cooperate in validity verification of the remote control instruction.

In a possible implementation, the apparatus further includes a storage unit. The storage unit is configured to store the authorization token and the whitelist. The processing unit 1730 is further configured to update the whitelist. The transceiver unit 1710 is further configured to send an updated whitelist to the remote device.

In a design, the apparatus 1700 is configured to perform an action performed by the remote device in the method embodiments.

In a possible implementation, the apparatus includes a transceiver unit 1710 and a processing unit 1730. The transceiver unit 1710 is configured to receive second request information, where the second request information includes a remote control instruction and an authorization token. The processing unit 1730 is configured to verify validity of the authorization token, and verify validity of the remote control instruction if the authorization token is valid.

In one embodiment, the verifying validity of the authorization token includes at least one of the following verifications: verifying whether the device management system is consistent with the authorized-object identifier, verifying whether a controlled-object ID is consistent with a remote device identifier, verifying time validity of the token, verifying whether a signature verification key of the token issuer is configured on the remote device, and verifying consistency of a digital signature of the authorization token.

In one embodiment, the verifying validity of the remote control instruction by using the authorization token includes at least one of the following verifications: verifying whether the remote device identifier is consistent with the controlled-object identifier in the authorization token, verifying whether the remote control instruction is within an allowed operation range of the authorization token, and verifying whether a key parameter is within a key parameter range of the authorization token.

In a possible implementation, the second request information includes a whitelist, and the processing unit 1730 is configured to verify whether the authorization token ID is in an ID whitelist.

In a possible implementation, the second request information includes the blacklist, and the processing unit 1730 is configured to verify whether an authorization token ID is in the ID blacklist.

In a possible implementation, the processing unit 1730 is further configured to verify validity of the whitelist. The processing unit 1730 is configured to: verify consistency between a remote device identifier and a controlled-object identifier in the whitelist, verify whether a whitelist issuance time is less than or equal to a first threshold, and verify consistency of a whitelist signature.

In a possible implementation, the processing unit 1730 is further configured to determine a whitelist feature value according to the whitelist, where the whitelist feature value identifies the whitelist. The processing unit 1730 is further configured to sign and/or encrypt the whitelist feature value. The transceiver unit 1710 is configured to send the signed and/or encrypted whitelist feature value to the terminal device.

It should be understood that a process in which the units perform the foregoing corresponding operations is described in detail in the foregoing method embodiments. For brevity, details are not described herein again.

It should be further understood that the processing unit in FIG. 17 may be implemented by at least one processor or a processor-related circuit, the obtaining unit and the transceiver unit may be implemented by a transceiver or a transceiver-related circuit, and the storage unit may be implemented by at least one memory.

Figure 18:
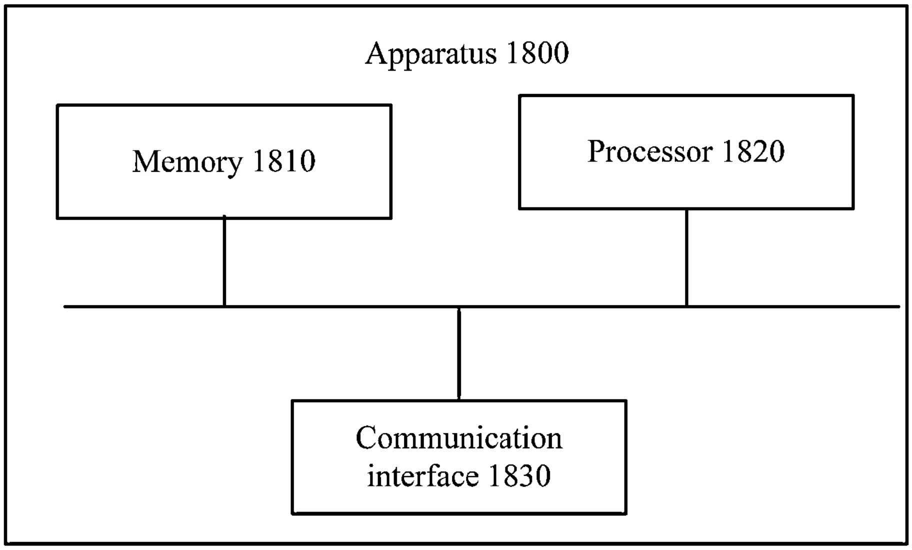
FIG. 18 shows another remote control apparatus 1800 according to an embodiment of this application.

FIG. 18 is a schematic diagram of a remote control apparatus 1800 according to an embodiment of this application. The apparatus may be applied to the remote control system 100 in FIG. 1, and may also be applied to the remote control system 1000 in FIG. 10.

The remote control apparatus includes: a memory 1810, a processor 1820, and a communication interface 1830. The memory 1810, the processor 1820, and the communication interface 1830 are connected by using an internal connection path. The memory 1810 is configured to store instructions. The processor 1820 is configured to execute the instructions stored in the memory 1810, to control the input/output interface 1830 to receive/send at least some parameters of a second channel model. In one embodiment, the memory 1810 may be coupled to the processor 1820 through an interface, or may be integrated with the processor 1820.

It should be noted that the communication interface 1830 implements communication between the communication device 1800 and another device or a communication network by using, for example but not limited to, a transceiver apparatus such as a transceiver. The communication interface 1830 may further include an input/output interface (input/output interface).

In an implementation process, operations in the methods may be implemented by using a hardware integrated logic circuit in the processor 1820, or by using instructions in a form of software. The methods disclosed with reference to embodiments of this application may be directly performed by a hardware processor, or may be performed by a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1810, and the processor 1820 reads information in the memory 1810 and completes the operations in the foregoing methods in combination with hardware of the processor 1820. To avoid repetition, details are not described herein again.

An embodiment of this application further provides a computer-readable medium, where the computer-readable medium stores program code. When the computer program code is run on a computer, the computer is enabled to perform any one of the methods in FIG. 3 to FIG. 16.

An embodiment of this application further provides a chip, including at least one processor and a memory. The at least one processor is coupled to the memory, and is configured to read and execute instructions in the memory, to perform any one of the methods in FIG. 3 to FIG. 16.

An embodiment of this application further provides a vehicle, including at least one processor and a memory. The at least one processor is coupled to the memory, and is configured to read and execute instructions in the memory, to perform any one of the methods in FIG. 3 to FIG. 16.

An embodiment of this application further provides an intelligent vehicle, including the remote control authorization token apparatus in FIG. 17 or FIG. 18.

It should be understood that, in embodiments of this application, the processor may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like.

It should also be understood that, in embodiments of this application, the memory may include a read-only memory and a random access memory, and provide instructions and data to the processor. A part of the processor may further include a non-volatile random access memory. For example, the processor may further store device type information.

It should be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification generally indicates an "or" relationship between the associated objects.

It should be further understood that sequence numbers of the processes do not mean execution sequences in various embodiments of this application. The execution sequences of the processes should be determined according to functions and internal logic of the processes, and should not be construed as any limitation on the implementation processes of embodiments of this application.

Terms such as "component" and "module" used in this specification are used to indicate computer-related entities, hardware, firmware, combinations of hardware and software, software, or software being executed. For example, a component may be, but is not limited to, a process that runs on a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed operating process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to an actual requirement to achieve the objectives of the solutions of the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A remote control method, comprising:

receiving, by a remote device, second request information from a device management system, wherein the second request information comprises a remote control instruction and an authorization token, wherein the authorization token comprises authorization token content and authorization token signature information;

the authorization token content comprises at least one of a token ID, an issuer identifier, an authorized-object identifier, an authorization content list, an issuance time, a validity period start time, or a validity period end time; and the authorization token signature information comprises signature data or signature data and a signature algorithm;

verifying, by the remote device, a validity of the authorization token; and verifying, by the remote device, a validity of the remote control instruction based on the verifying of the authorization token.

2. The method according to claim 1, wherein the authorization content list comprises at least one of a controlled-object identifier (ID), an operation, or a key parameter.

3. The method according to claim 2, wherein the verifying the validity of the authorization token comprises at least one of the following:

verifying whether the device management system is consistent with the authorized-object identifier;

verifying whether a controlled-object ID is consistent with a remote device identifier;

verifying time validity of the token;

verifying whether a signature verification key of a token issuer of the authorization token is configured on the remote device; or verifying consistency of a digital signature of the authorization token.

4. The method according to claim 3, wherein the verifying the validity of the remote control instruction comprises at least one of the following:

verifying whether the remote device identifier is consistent with the controlled-object ID in the authorization token;

verifying whether the remote control instruction is within an allowed operation range of the authorization token; or verifying whether the key parameter is within a key parameter range of the authorization token.

5. The method according to claim 1, wherein the second request information further comprises a blacklist, and the verifying the validity of the authorization token further comprises:

verifying whether an authorization token ID corresponding to the authorization token is in an ID blacklist.

6. The method according to claim 1, wherein the second request information further comprises a whitelist, and the verifying the validity of the authorization token further comprises:

verifying whether an authorization token ID corresponding to the authorization token is in an ID whitelist.

7. The method according to claim 6, wherein the method further comprises:

verifying, by the remote device, a validity of the whitelist.

8. The method according to claim 7, wherein the verifying the validity of the whitelist comprises at least one of the following:

verifying consistency between a whitelist-controlled object and a remote device identifier;

verifying whether a whitelist issuance time is less than or equal to a first threshold; or verifying consistency of a whitelist signature.

9. The method according to claim 6, wherein the method further comprises:

determining, by the remote device, a whitelist feature value according to the whitelist, wherein the whitelist feature value identifies the whitelist;

signing and/or encrypting, by the remote device, the whitelist feature value; and sending, by the remote device, the signed and/or encrypted whitelist feature value to a terminal device.

10. A remote control method, comprising:

obtaining, by a terminal device, an authorization token, wherein the authorization token comprises authorization token content and authorization token signature information;

the authorization token content comprises at least one of a token ID, an issuer identifier, an authorized-object identifier, an authorization content list, an issuance time, a validity period start time, or a validity period end time; and the authorization token signature information comprises signature data or signature data and a signature algorithm; and sending, by the terminal device, first request information comprising an operation request and the authorization token to a device management system, wherein the operation request is used to request the device management system to deliver a remote control instruction to a remote device, and the authorization token is used to verify a validity of the remote control instruction.

11. The method according to claim 10, wherein the authorization content list comprises at least one of a controlled-object identifier, an operation, or a key parameter.

12. The method according to claim 10, wherein the first request information further comprises a whitelist comprising whitelist content and whitelist signature information;

the whitelist content comprises at least one of a whitelist ID, an issuer identifier, an authorized-object identifier, a controlled object, an authorization token ID list, or an issuance time; and the whitelist signature information comprises signature data or signature data and a signature algorithm.

13. The method according to claim 12, wherein the method further comprises:

generating, by the terminal device, authorization token content according to a user operation;

issuing the authorization token;

determining, by the terminal device, a task type of the user operation; and determining, by the terminal device according to the task type of the user operation, whether to issue a new authorization token and whether to update the whitelist.

14. The method according to claim 12, wherein the method further comprises:

updating a key;

re-issuing, by the terminal device, the whitelist and the authorization token using an updated key; and sending, by the terminal device, third request information to the device management system, wherein the third request information comprises the re-issued whitelist and the authorization token.

15. The method according to claim 10, wherein the method further comprises:

obtaining, by the terminal device, a whitelist;

verifying a validity of the whitelist, wherein the verifying the validity of the whitelist comprises at least one of the following:

verifying whether a whitelist issuer is valid;

verifying whether a whitelist-authorized object is valid;

verifying whether a whitelist-controlled object is valid; or verifying consistency of a whitelist signature.

16. The method according to claim 15, wherein the method further comprises:

storing, by the terminal device, a whitelist feature value that identifies the whitelist; and the verifying the validity of the whitelist comprises:

verifying the validity of the whitelist using the whitelist feature value.

17. The method according to claim 16, wherein the method further comprises:

obtaining, by the terminal device, the whitelist feature value from the remote device;

verifying, by the terminal device, the whitelist feature value; and responsive to the verification succeeding, storing, by the terminal device, the whitelist feature value.

18. The method according to claim 16, wherein the whitelist feature value is a signed and/or encrypted whitelist feature value.

19. The method according to claim 18, wherein the verifying the whitelist feature value further comprises:

performing signature verification and/or decryption on the whitelist feature value.

20. A remote control apparatus, comprising:

at least one processor; and a memory to store instructions that, when executed by the at least one processor, cause the at least one processor to:

receive second request information from a device management system, wherein the second request information comprises a remote control instruction and an authorization token, wherein the authorization token comprises authorization token content and authorization token signature information;

the authorization token content comprises at least one of a token ID, an issuer identifier, an authorized-object identifier, an authorization content list, an issuance time, a validity period start time, or a validity period end time; and the authorization token signature information comprises signature data or signature data and a signature algorithm;

verify a validity of the authorization token; and verify a validity of the remote control instruction based on the verifying of the authorization token.

* * * * *